(12) United States Patent
Sakaguchi et al.

(10) Patent No.: US 12,191,448 B2
(45) Date of Patent: Jan. 7, 2025

(54) NONAQUEOUS ELECTROLYTE SOLUTION FOR SECONDARY BATTERY, AND SECONDARY BATTERY PROVIDED WITH SAID SOLUTION

(71) Applicant: STELLA CHEMIFA CORPORATION, Osaka (JP)

(72) Inventors: Toshitaka Sakaguchi, Sakai (JP); Yoshifumi Katsura, Sakai (JP); Sojiro Kon, Sakai (JP); Masashi Yamamoto, Sakai (JP); Tetsuo Nishida, Sakai (JP)

(73) Assignee: Stella Chemifa Corporation, Osaka (JP)

( * ) Notice: Subject to any disclaimer, the term of this patent is extended or adjusted under 35 U.S.C. 154(b) by 738 days.

(21) Appl. No.: 16/065,721

(22) PCT Filed: Dec. 22, 2016

(86) PCT No.: PCT/JP2016/088508
§ 371 (c)(1),
(2) Date: Jun. 22, 2018

(87) PCT Pub. No.: WO2017/111096
PCT Pub. Date: Jun. 29, 2017

(65) Prior Publication Data
US 2021/0202991 A1      Jul. 1, 2021

(30) Foreign Application Priority Data
Dec. 25, 2015  (JP) ................. 2015-252847

(51) Int. Cl.
*H01M 10/0567*    (2010.01)
*H01M 10/0525*    (2010.01)
*H01M 10/0568*    (2010.01)

(52) U.S. Cl.
CPC ... *H01M 10/0567* (2013.01); *H01M 10/0525* (2013.01); *H01M 10/0568* (2013.01); *H01M 2300/0037* (2013.01)

(58) Field of Classification Search
None
See application file for complete search history.

(56) References Cited

U.S. PATENT DOCUMENTS

2008/0305402 A1   12/2008  Kato et al.
2011/0117446 A1*   5/2011  Lucht .............. H01M 10/056
                                                429/331
(Continued)

FOREIGN PATENT DOCUMENTS

CN      102473962 A     5/2012
CN      105940544 A     9/2016
(Continued)

OTHER PUBLICATIONS

English language machine translation of JP-2013239307-A. (Year: 2023).*

(Continued)

*Primary Examiner* — Eli S Mekhlin
(74) *Attorney, Agent, or Firm* — Knobbe, Martens, Olson & Bear, LLP

(57) ABSTRACT

Provided are a nonaqueous electrolytic solution for a secondary battery that exhibits excellent cycle characteristics even in high temperature environment, and a secondary battery including the same. The nonaqueous electrolytic solution for a secondary battery of the present invention is a nonaqueous electrolyte solution for a secondary battery which is used for a secondary battery, including at least one component (A) represented by the following chemical formula (1):

(Continued)

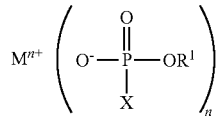

(1)

in which $M^{n+}$ represents at least one selected from the group consisting of a hydrogen ion, an alkali metal ion, an alkaline earth metal ion, an aluminum ion, a transition metal ion and an onium ion, X represents a halogen atom, $R^1$ represents a hydrocarbon group having 1 to 20 carbon atoms, or a hydrocarbon group having 1 to 20 carbon atoms and having at least any one of a halogen atom, a heteroatom or an unsaturated bond, and n represents a valence.

15 Claims, 1 Drawing Sheet

(56) References Cited

U.S. PATENT DOCUMENTS

| | | | |
|---|---|---|---|
| 2011/0189550 A1* | 8/2011 | Zhao | H01M 10/0567 429/188 |
| 2013/0236790 A1* | 9/2013 | Byun | H01M 4/505 29/623.5 |
| 2014/0045057 A1* | 2/2014 | Tode | H01M 10/0561 429/188 |
| 2014/0335413 A1* | 11/2014 | Ooishi | H01M 4/366 429/220 |
| 2014/0342243 A1* | 11/2014 | Park | H01M 10/0569 429/188 |
| 2016/0329613 A1* | 11/2016 | Kusachi | H01M 4/661 |
| 2016/0351961 A1* | 12/2016 | Abe | H01M 10/0568 |
| 2016/0365605 A1* | 12/2016 | Garsuch | H01M 10/0565 |
| 2017/0077550 A1* | 3/2017 | Nishie | H01M 10/0525 |

FOREIGN PATENT DOCUMENTS

| | | | |
|---|---|---|---|
| CN | 106063019 A | | 10/2016 |
| CN | 106170885 A | | 11/2016 |
| EP | 1 798 792 A1 | | 6/2007 |
| JP | H08-138733 A | | 5/1996 |
| JP | A2004-31079 | | 1/2004 |
| JP | 2007-035617 | | 2/2007 |
| JP | 2007-173180 A | | 7/2007 |
| JP | 2008-97954 A | | 4/2008 |
| JP | 2010-045341 A | | 2/2010 |
| JP | 2012-190700 A | | 10/2012 |
| JP | 2013239307 A | * | 11/2013 |
| JP | 2014-022333 A | | 2/2014 |
| JP | 2015-035378 A | | 2/2015 |
| JP | 2015-167129 A | | 9/2015 |
| JP | 2015-225749 A | | 12/2015 |
| KR | 20120036882 A | | 4/2012 |
| KR | 20160121521 A | | 10/2016 |
| TW | 201613166 A | | 4/2016 |
| WO | WO 2011/121912 A1 | | 10/2011 |
| WO | WO 2015/122512 A1 | | 8/2015 |
| WO | WO 2015/133097 A1 | | 9/2015 |
| WO | WO 2016/024496 A1 | | 2/2016 |

OTHER PUBLICATIONS

Office Action issued in corresponding Chinese application No. 201680076242.6 dated Dec. 3, 2020.
Extended European Search Report received in connection with European Patent Application No. 16878982.4 dated Nov. 6, 2018.
Office Action issued by the Japan Patent Office on Oct. 23, 2020, for the corresponding Japanese Application No. 2019-148732.
Office Action issued in Japanese Application No. 2019-148732, dated May 19, 2021.
Office Action issued in Japanese Application No. 2019-148732, dated Nov. 30, 2021.
Office Action issued in Chinese Application No. 201680076242.6, dated Aug. 6, 2021.

* cited by examiner

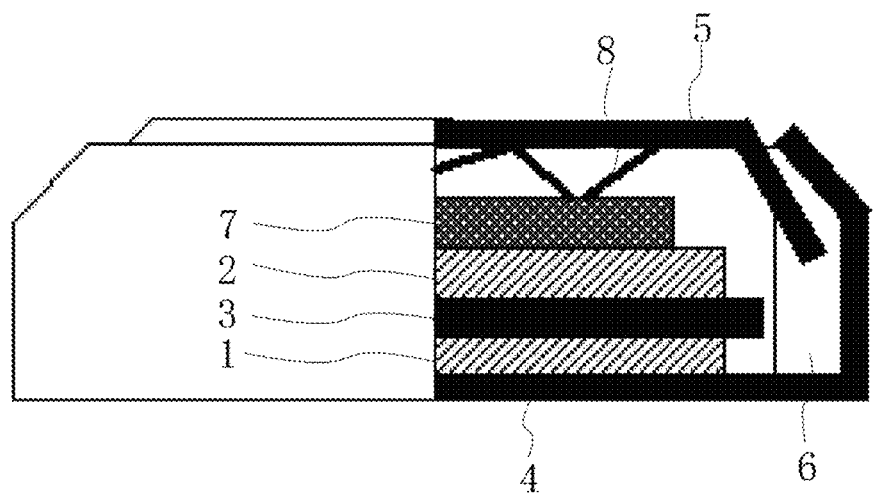

NONAQUEOUS ELECTROLYTE SOLUTION FOR SECONDARY BATTERY, AND SECONDARY BATTERY PROVIDED WITH SAID SOLUTION

TECHNICAL FIELD

The present invention relates to a nonaqueous electrolytic solution for a secondary battery that exhibits excellent cycle characteristics even in high temperature environment, and a secondary battery including the same.

BACKGROUND ART

With the recent development of electronic technology and the growing interest in environmental technology, various electrochemical devices have been developed. In particular, expectations for electrochemical devices that can contribute to energy saving are increasing more and more. Such electrochemical device includes, for example, a fuel cell and a solar cell as a power generation device, and the electric storage device includes, for example, a secondary battery, a capacitor, a condenser and the like. The applied field secondary battery including a lithium secondary battery is pursued further high performance, such as improvements of a power density and energy density as well as a reduction of a capacity loss, in association with an increase in uses from electronic devices such as mobile phones, personal computers and digital cameras to vehicle installation. For in-vehicle usage, durability that is higher than before is desired against an ambient operating temperature which are both of high temperatures and low temperatures. Particularly, regarding high-temperature environments, when a cell is increased in size, since the cell is constantly exposed to a relatively high temperature due to not only the usage environment but also self-generated heat, an improvement of high-temperature durability is very important.

In conventional common lithium secondary batteries, materials in which Li ions can be reversibly inserted are used for a positive electrode active material and a negative electrode active material. For examples, a compound such as $LiNiO_2$, $LiCoO_2$, $LiMn_2O_4$ or $LiFePO_4$ is used for the positive electrode active material. Lithium metal, an alloy thereof, a carbon material, a graphite material or the like is used for the negative electrode active material. Furthermore, an electrolyte solution formed by dissolving an electrolyte such as $LiPF_6$ or $LiBF_4$ in a mixed solvent such as ethylene carbonate, diethyl carbonate and propylene carbonate is used for an electrolyte solution to be used for the lithium secondary battery.

Generally, there is understanding that a stable coating (solid electrolyte interface: SEI) having lithium ion conductivity but not having electronic conductivity is formed at an interface between the electrode active material and the electrolyte solution. The process of insertion in an electrode active material/desertion from an electrode active material of lithium ions is high in reversibility; however, when charge-discharge is repeated in the high-temperature environments, cracks occur or dissolution/decomposition takes place at the stable interface and therefore charge-discharge characteristics tend to be lowered or impedance tends to increase.

Patent Document 1 discloses that a film can be formed on a positive electrode and a negative electrode of a lithium secondary battery by using a nonaqueous electrolytic solution containing a monofluorophosphate or a difluorophosphate as an additive, whereby, the decomposition of the electrolytic solution due to contact of the nonaqueous electrolytic solution with the positive electrode active material and the negative electrode active material is suppressed, thus enabling suppression of self-discharge, improvement in storage performance and improvement in output characteristics. However, improvement in cycle characteristics in high-temperature environments is required.

For example, fluoroethylene carbonate as an additive for a nonaqueous electrolytic solution has widely been known as a compound capable of forming satisfactory SEI. It is understood that fluoroethylene carbonate suppresses reductive decomposition of the nonaqueous electrolytic solution, thus making it possible to stably charge the battery. Patent Document 2 discloses that satisfactory cycle characteristics can be obtained by using an electrolytic solution containing fluoroethylene carbonate added therein. However, aforementioned Patent Documents does not disclose improvement in cycle characteristics in high-temperature environments, and further improvement is required.

PRIOR ART DOCUMENTS

Patent Documents

Patent Document 1: JP-A-2004-31079
Patent Document 2: JP-A-2008-97954

SUMMARY OF THE INVENTION

Problems to be Solved by the Invention

The present invention has been made in view of the above-mentioned problem, and it is an object of the present invention to provide a nonaqueous electrolytic solution for a secondary battery that exhibits excellent cycle characteristics even in high temperature environment, and a secondary battery including the same.

Solutions to the Problems

In order to solve the above-mentioned problems, the nonaqueous electrolyte solution for a secondary battery of the present invention is a nonaqueous electrolyte solution for a secondary battery which is used for a secondary battery, comprising at least one component (A) represented by the following chemical formula (1):

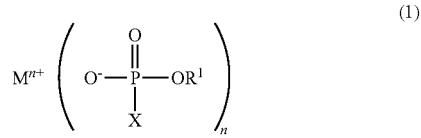

in which $M^{n+}$ represents at least one selected from the group consisting of a hydrogen ion, an alkali metal ion, an alkaline earth metal ion, an aluminum ion, a transition metal ion and an onium ion, X represents a halogen atom, $R^1$ represents a hydrocarbon group having 1 to 20 carbon atoms, or a hydrocarbon group having 1 to 20 carbon atoms and having at least any one of a halogen atom, a heteroatom or an unsaturated bond, and n represents a valence.

In the configuration, it is possible to further include the following at least one component (B):

component (B): a boron complex salt represented by the following chemical formula (2), or a boric acid ester, an acid anhydride, a cyclic carbonate having an unsaturated bond, a cyclic carbonate having a halogen atom, a cyclic sulfonic acid ester, amines having an acetoacetyl group represented by the following chemical formula (3), and at least one compound selected from the group consisting of phosphorus compounds represented by the following chemical formula (4) to (6):

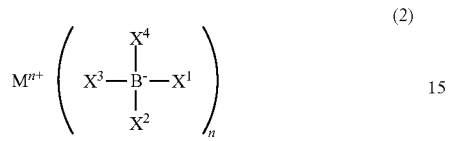

(2)

in which $M^{n+}$ represents a hydrogen ion, an alkali metal ion, an alkaline earth metal ion, an aluminum ion, a transition metal ion or an onium ion, $X^1$ to $X^4$ are independent of each other, and optionally selected one or two combinations form a cyclic structure of —OOC—Y—COO—, —O—Y—O— or —OOC—Y—O— in which Y represents a hydrocarbon group having 0 to 20 carbon atoms, or a hydrocarbon group having 0 to 20 carbon atoms and having a heteroatom, an unsaturated bond, or a cyclic structure, or $X^1$ to $X^4$ each independently represent a halogen atom, an alkyl group having 0 to 20 carbon atoms, an alkoxy group having 0 to 20 carbon atoms, an alkyl group having 0 to 20 carbon atoms and having at least any one of a halogen atom, a heteroatom or an unsaturated bond, or an alkoxy group having 0 to 20 carbon atoms and having at least any one of a halogen atom, a heteroatom or an unsaturated bond, and n represents a valence,

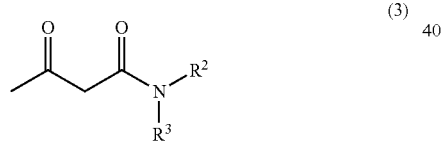

(3)

in which $R^2$ and $R^3$ each independently represent a hydrocarbon group having 1 to 20 carbon atoms, or a hydrocarbon group having 1 to 20 carbon atoms and having a halogen atom, a heteroatom or an unsaturated bond,

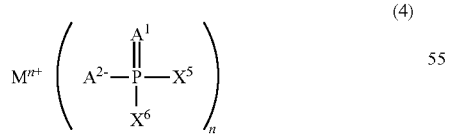

(4)

in which $M^{n+}$ represents a hydrogen ion, an alkali metal ion, an alkaline earth metal ion, an aluminum ion, a transition metal ion or an onium ion, $A^1$ and $A^2$ each independently represent an oxygen atom, a sulfur atom or a selenium atom, $X^5$ and $X^6$ each independently represent a halogen atom, an alkyl group having 1 to 20 carbon atoms, or an alkyl group having 1 to 20 carbon atoms and having at least any one of a halogen atom, a heteroatom or an unsaturated bond, or $X^5$ and $X^6$ represent any one of an alkyl group having 1 to 20 carbon atoms, or an alkyl group having 1 to 20 carbon atoms and having at least any one of a halogen atom, a heteroatom or an unsaturated bond, and are coupled to each other to form a cyclic structure, and n represents a valence,

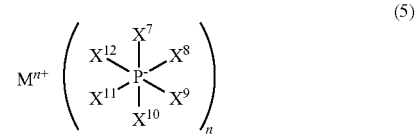

(5)

in which $M^{n+}$ represents a hydrogen ion, an alkali metal ion, an alkaline earth metal ion, an aluminum ion, a transition metal ion or an onium ion, $X^7$ to $X^{12}$ each independently represent a halogen atom, an alkyl group having 1 to 20 carbon atoms, an alkoxy group having 1 to 20 carbon atoms, an alkylthio group having 1 to 20 carbon atoms, an alkyl group having 1 to 20 carbon atoms and having at least any one of a halogen atom, a heteroatom or an unsaturated bond, an alkylthio group having 1 to 20 carbon atoms, an alkoxy group having 1 to 20 carbon atoms and having at least any one of a halogen atom, a heteroatom or an unsaturated bond, an alkylthio group having 1 to 20 carbon atoms, or an alkylthio group having 1 to 20 carbon atoms and having at least any one of a halogen atom, a heteroatom or an unsaturated bond, or at least one of combinations optionally selected from $X^7$ to $X^{12}$ forms a cyclic structure of —OOC—Z—COO—, —OOC—Z—O— or —O—Z—O— in which Z represents a hydrocarbon group having 0 to 20 carbon atoms, or a hydrocarbon group having 0 to 20 carbon atoms and having at least any one of a halogen atom, a heteroatom, an unsaturated bond or a cyclic structure, and n represents a valence,

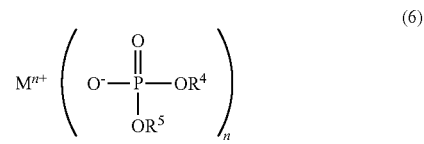

(6)

in which $M^{n+}$ represents a hydrogen ion, an alkali metal ion, an alkaline earth metal ion, an aluminum ion, a transition metal ion or an onium ion, $R^4$ and $R^5$ each independently represent a hydrocarbon group having 1 to 20 carbon atoms, or a hydrocarbon group having 1 to 20 carbon atoms and having at least any one of a halogen atom, a heteroatom or an unsaturated bond, or $R^4$ and $R^5$ represent any one of a hydrocarbon group having 1 to 20 carbon atoms, or a hydrocarbon group having 1 to 20 carbon atoms and having at least any one of a halogen atom, a heteroatom or an unsaturated bond, and are coupled to each other to form a cyclic structure, and n represents a valence.

In the above-mentioned configuration, it is preferable that an addition amount of the component (A) is 0.05% by mass to 5% by mass of a total mass of the nonaqueous electrolyte solution for a secondary battery.

In the above-mentioned configuration, it is preferable that an addition amount of the component (B) is 0.05% by mass to 5% by mass of a total mass of the nonaqueous electrolyte solution for a secondary battery.

In the above-mentioned configuration, it is preferable that the component (A) is lithium ethyl monofluorophosphate.

In order to solve the above-mentioned problems, the secondary battery according to the present invention comprises at least: the nonaqueous electrolyte solution for secondary batteries; a positive electrode; and a negative electrode.

Effects of the Invention

According to the present invention, it is possible to provide a nonaqueous electrolytic solution for a secondary battery that exhibits excellent cycle characteristics even in high temperature environment, and a secondary battery including the same. Although a mechanism thereof is unclear, it is estimated that the inclusion of at least one components (A) represented by the chemical formula (1) leads to formation of a coating film on a surface of electrode active materials, and cycle characteristics in high-temperature environments are improved by properties of the film, i.e., characteristics such as thermal stability and film quality contributes to improvements.

BRIEF DESCRIPTION OF THE DRAWINGS

FIG. 1 is a schematic sectional view showing an outline of a cell for evaluation of electrochemical characteristics provided with a nonaqueous electrolyte solution for a secondary battery of the present invention.

DETAILED DESCRIPTION OF THE PREFERRED EMBODIMENT (Nonaqueous Electrolytic Solution for Secondary Battery)

A nonaqueous electrolyte solution for a secondary battery (hereinafter referred to as "nonaqueous electrolyte solution") of the present embodiment is an electrolyte solution in which an organic solvent (nonaqueous solvent) includes at least one component (A) mentioned later as an additive.

An irreversible reaction of decomposition of the nonaqueous electrolyte solution takes place at an interface between the electrode and the nonaqueous electrolyte solution in initial charge. It is considered that properties of a coating to be formed, for example, properties such as thermal stability, ionic conductivity, morphology and denseness, vary significantly according to an electrode active material, types of the nonaqueous solvent, the electrolyte and additives in the nonaqueous electrolyte solution and charge-discharge conditions. In the present embodiment, it is considered that by adding the component (A) to the nonaqueous electrolyte solution, a coating film is formed on the surface of an electrode active material, and cycle characteristics of the secondary battery in high-temperature environments (e.g., 40° C. to 80° C.) are improved resulting from the properties of the coating film, i.e., the effects of thermal stability and coating quality.

<Component (A)>

At least one of the component (A) is contained in the nonaqueous electrolyte solution and is specifically a compound represented by the following chemical formula (1).

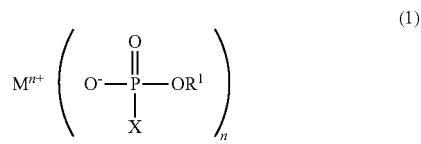

(1)

In the general formula (1), $M^{n+}$ represents at least one selected from the group consisting of a hydrogen atom, an alkali metal ion, an alkaline earth metal ion, an aluminum ion, a transition metal ion and an onium ion.

The alkali metal ion is not particularly limited, and examples thereof include a lithium ion, a sodium ion, a potassium ion, a rubidium ion, a cesium ion and the like. These alkali metal ions may be used alone or may be used in combination of two kinds or more thereof.

Examples of the alkaline earth metal ion include a magnesium ion, a calcium ion, a strontium ion, a barium ion and the like. These alkaline earth metal ions may be used alone or may be used in combination of two kinds or more thereof.

The transition metal ion is not particularly limited, and examples thereof include a manganese ion, a cobalt ion, a nickel ion, a chromium ion, a copper ion, a silver ion, a molybdenum ion, a tungsten ion, a vanadium ion and the like. These transition metal ions may be used alone or may be used in combination of two kinds or more thereof.

Examples of the onium ion include an ammonium ion ($NH_4^+$), a primary ammonium ion, a secondary ammonium ion, a tertiary ammonium ion, a quaternary ammonium ion, a quaternary phosphonium ion, a sulfonium ion and the like.

The primary ammonium ion is not particularly limited, and examples thereof include a methylammonium ion, an ethylammonium ion, a propylammonium ion, an isopropylammonium ion and the like. These primary ammonium ions may be used alone or may be used in combination of two kinds or more thereof.

The secondary ammonium ion is not particularly limited, and examples thereof include a dimethylammonium ion, a diethylammonium ion, a dipropylammonium ion, a dibutylammonium ion, an ethyl(methyl)ammonium ion, a methyl propyl ammonium ion, a methyl butyl ammonium ion, a propyl butyl ammonium ion, a diisopropylammonium ion and the like. These secondary ammonium ions may be used alone or may be used in combination of two kinds or more thereof.

Tertiary ammonium to form the tertiary ammonium ion is not particularly limited, and examples thereof include a trimethylammonium ion, a triethylammonium ion, a tripropylammonium ion, a tributylammonium ion, an ethyl dimethyl ammonium ion, a diethyl(methyl)ammonium ion, a triisopropylammonium ion, a dimethyl isopropyl ammonium ion, a diethyl isopropyl ammonium ion, a dimethyl propyl ammonium ion, a butyl dimethyl ammonium ion, a 1-methylpyrrolidinium ion, a 1-ethylpyrrolidinium ion, a 1-propylpyrrolidinium ion, a 1-butylpropylpyrrolidinium ion, a 1-methylimidazolium ion, a 1-ethylimidazolium ion, a 1-propylimidazolium ion, a 1-butylimidazolium ion, a pyrazolium ion, a 1-methylpyrazolium ion, a 1-ethylpyrazolium ion, a 1-propylpyrazolium ion, a 1-butylpyrazolium ion, a pyridinium ion and the like. These tertiary ammonium ions may be used alone or may be used in combination of two kinds or more thereof.

Quaternary ammonium to form the quaternary ammonium ion is not particularly limited, and examples thereof include aliphatic quaternary ammoniums, imidazoliums, pyridiniums, pyrazoliums, pyridaziniums and the like. These quaternary ammonium ions may be used alone or may be used in combination of two kinds or more thereof.

Moreover, theliphatic quaternary ammoniums are not particularly limited, and examples thereof include tetraethylammonium, tetrapropylammonium, tetraisopropylammonium, trimethylethylammonium, dimethyldiethylammonium, methyltriethylammonium, trimethylpropylammonium, trimethylisopropylammonium, tetrabutylammonium, trimethylbutylammonium, trimethylpentylammonium, trimethylhexylammonium, 1-ethyl-1-methylpyrrolidinium, 1-butyl-1-methylpyrrolidinium, 1-ethyl-1-methylpiperidinium, 1-butyl-1-methylpiperidinium and the like. These aliphatic quaternary ammonium ions may be used alone or may be used in combination of two kinds or more thereof.

The imidazoliums are not particularly limited, and examples thereof include 1,3-dimethyl-imidazolium, 1-ethyl-3-methylimidazolium, 1-n-propyl-3-methylimidazolium, 1-n-butyl-3-methylimidazolium, 1-n-hexyl-3-methylimidazolium and the like. These imidazoliums may be used alone or may be used in combination of two kinds or more thereof.

The pyridiniums are not particularly limited, and examples thereof include 1-methylpyridinium, 1-ethylpyridinium, 1-n-propylpyridinium and the like. These pyridiniums may be used alone or may be used in combination of two kinds or more thereof.

The pyrazoliums are not particularly limited, and examples thereof include 1,2-dimethylpyrazolium, 1-methyl-2-ethylpyrazolium, 1-propyl-2-methylpyrazolium, 1-methyl-2-butylpyrazolium, 1-methylpyrazolium, 3-methylpyrazolium, 4-methylpyrazolium, 4-iodopyrazolium, 4-bromopyrazolium, 4-iodo-3-methylpyrazolium, 4-bromo-3-methylpyrazolium and 3-trifluoromethylpyrazolium. These pyrazoliums may be used alone or may be used in combination of two kinds or more thereof.

The pyridaziniums are not particularly limited, and examples thereof include 1-methylpyridazinium, 1-ethylpyridazinium, 1-propylpyridazinium, 1-butylpyridazinium, 3-methylpyridazinium, 4-methylpyridazinium, 3-methoxypyridazinium, 3,6-dichloropyridazinium, 3,6-dichloro-4-methylpyridazinium, 3-chloro-6-methylpyridazinium and 3-chloro-6-methoxypyridazinium. These pyridaziniums may be used alone or may be used in combination of two kinds or more thereof.

Quaternary phosphonium to form the quaternary phosphonium ion is not particularly limited, and examples thereof include benzyltriphenylphosphonium, tetraethylphosphonium, tetraphenylphosphonium and the like. These phosphoniums may be used alone or may be used in combination of two kinds or more thereof.

The sulfonium ion is not particularly limited, and examples thereof include trimethylsulfonium, triphenylsulfonium, triethylsulfonium and the like. These sulfoniums may be used alone or may be used in combination of two kinds or more thereof.

Of the ions as described as an exemplification of $M^{n+}$, lithium, sodium ion, potassium, magnesium, calcium, tetraalkylammonium ion, alkylimidazolium ion, alkylpyrrolidinium ion, and alkylpyridinium ion are preferred from the viewpoint of ease of availability.

X represents a halogen atom. The halogen atom is any one of iodine, bromine, chlorine and fluorine. Of these halogen atoms, fluorine is particularly preferred from the viewpoint of the hydrolysis and thermal stability of a compound represented by the chemical formula (1).

In the chemical formula (1), $R^1$ represents a hydrocarbon group, or a hydrocarbon group having at least any one of a halogen atom, a heteroatom or an unsaturated bond (hereinafter, referred to as "hydrocarbon group having a halogen atom or the like"). The number of the hydrocarbon group is in a range of 1 to 20, preferably 1 to 10, and more preferably 1 to 4. The number of carbon atoms of the hydrocarbon group having a halogen atom or the like is in a range of 1 to 20, preferably 1 to 10, and more preferably 1 to 4. The number of the unsaturated bonds is preferably in a range of 1 to 10, more preferably 1 to 5, and particularly preferably 1 to 3.

The hydrocarbon group, or the hydrocarbon group having a halogen atom or the like is not particularly limited, and examples thereof include a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; halogen-containing chain alkyl groups such as a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a hexafluoro-2-propyl group; halogen-containing cyclic alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and 3-cyclohexenyl group; chain alkynyl groups such as a 2-propynyl group, a 1-butynyl group, a 2-butynyl group, a 3-butynyl group, a 1-pentynyl group, a 2-pentynyl group, a 3-pentynyl group and 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; and naphthyl groups such as a 1-naphthyl group, a 2-naphthyl group and a 3-amino-2-naphthyl group.

The halogen atom means an atom of fluorine, chlorine, bromine or iodine. The hydrocarbon group having a halogen atom means that part of or all of hydrogens in the alkyl group may be substituted with any of these halogen atoms. The hetero atom means an atom of oxygen, nitrogen, sulfur or the like. The hydrocarbon group having a heteroatom means that part of or all of hydrogens and carbons in the hydrocarbon group may be substituted with any of these heteroatoms.

Specifically, examples of the hydrocarbon group having a heteroatom include a 2-methoxyethyl group, a 2-(2-methoxyethoxy)ethyl group, a 2-(2-(2-methoxyethoxy)ethoxy)ethyl group, a 2-(2-(2-(2-methoxyethoxy)ethoxy)ethoxy)ethyl group and the like.

In the chemical formula (1), n represents a valence. For example, when M is a monovalent cation, n=1, and n=2 in the case of a divalent cation, and n=3 in the case of a trivalent cation.

Specific examples of the monofluorophosphoric acid ester represented by the chemical formula (1) include ethyl monofluorophosphate, lithium methyl monofluorophosphate, lithium ethyl monofluorophosphate, lithium isopropyl monofluorophosphate, lithium butyl monofluorophosphate, lithium (2-ethoxyethyl)monofluorophosphate, lithium (2,2,2-trichloroethyl)monofluorophosphate, lithium (1,1,1,3,3,3-hexachloroisopropyl)monofluorophosphate, lithium (2,2,2-trifluoroethyl)monofluorophosphate, lithium (1,1,1,3,3,3-hexafluoroisopropyl)monofluorophosphate, lithium (2-methoxyethyl)monofluorophosphate, lithium (2-(2-methoxyethoxy)ethyl)monofluorophosphate, lithium (2-(2-(2-methoxyethoxy)ethoxy)ethyl)monofluorophosphate, lithium (2-(2-(2-(2-methoxyethoxy)ethoxy)ethoxy)ethyl) monofluorophosphate, sodium methyl monofluorophosphate, sodium ethyl monofluorophosphate, sodium propyl monofluorophosphate, sodium (2,2,2-trichloroethyl) monofluorophosphate, sodium (2,2,2-trichloroethyl)monofluorophosphate, sodium (1,1,1,3,3,3-hexachloroisopropyl)monofluorophosphate, sodium (2,2,2-trifluoroethyl) monofluorophosphate, sodium (2,2,2-trifluoroethyl) monofluorophosphate, sodium (2,2,2-trifluoroethyl)monofluorophosphate, sodium (1,1,1,3,3,3-hexafluoroisopropyl) monofluorophosphate, sodium (2-methoxyethyl)monofluorophosphate, sodium (2-(2-methoxyethoxy)ethyl) monofluorophosphate, sodium (2-(2-(2-methoxyethoxy) ethoxy)ethyl)monofluorophosphate, sodium (2-(2-(2-(2-methoxyethoxy)ethoxy)ethoxy)ethyl)monofluorophosphate, methyl 1-ethyl-3-methylimidazolium monofluorophosphate, methyl 1-ethyl-3-methylimidazolium monofluorophosphate, (2,2,2-trichloroethyl) 1-ethyl-3-methylimidazolium monofluorophosphate, (1,1,1,3,3,3-hexachloroisopropyl) 1-ethyl-3-methylimidazolium monofluorophosphate, (2,2,2-trifluoroethyl) 1-ethyl-3-methylimidazolium monofluorophosphate, (1,1,1,3,3,3-hexafluoroisopropyl) 1-ethyl-3-methylimidazolium monofluorophosphate, (2-methoxyethyl) 1-ethyl-3-methylimidazolium monofluorophosphate, (2-(2-methoxyethoxy)ethyl) 1-ethyl-3-methylimidazolium monofluorophosphate, (2-(2-(2-methoxyethoxy)ethoxy)ethyl) 1-ethyl-3-methylimidazolium monofluorophosphate, (2-(2-(2-(2-methoxyethoxy)ethoxy)ethoxy)ethyl) 1-ethyl-3-methylimidazolium monofluorophosphate, methyl triethylmethylammonium monofluorophosphate, ethyl triethylmethylammonium monofluorophosphate, propyl triethylmethylammonium monofluorophosphate, (2,2,2-trichloroethyl) triethylmethylammonium monofluorophosphate, (1,1,1,3,3,3-hexachloroisopropyl) triethylmethylammonium monofluorophosphate, (2,2,2-trifluoroethyl) triethylmethylammonium monofluorophosphate, (1,1,1,3,3,3-hexafluoroisopropyl) triethylmethylammonium monofluorophosphate, (2-methoxyethyl) triethylmethylammonium monofluorophosphate, (2-(2-methoxyethoxy)ethyl) triethylmethylammonium monofluorophosphate, (2-(2-(2-methoxyethoxy)ethoxy)ethyl) triethylmethylammonium monofluorophosphate, (2-(2-(2-(2-methoxyethoxy)ethoxy)ethoxy)ethyl) triethylmethylammonium monofluorophosphate and the like. The monofluorophosphoric acid ester is not limited to these compound groups.

Of these monofluorophosphoric acid esters, lithium ethyl monofluorophosphate is preferred from the viewpoint of ease of availability.

An addition amount of the component (A) is preferably in a range of 0.05% by mass to 5% by mass, more preferably 0.1% by mass to 3% by mass, and still more preferably 0.5% by mass to 2% by mass, based on the total mass of the nonaqueous electrolyte solution. When the addition amount is 0.05% by mass or more, it is possible to further improve the cycle characteristics of a secondary battery in high-temperature environments. On the other hand, when the addition amount is 5% by mass or less, it is possible to suppress lowering of the solubility of an electrolyte of a nonaqueous electrolyte solution in a solvent of a nonaqueous electrolyte solution.

In the present embodiment, with respect to the component (A), at least one phosphorus compound has to be contained in the nonaqueous electrolyte solution. However, the number of types of the component (A) to be contained is 1 to 5, more preferably 1 to 3, and particularly preferably 1 to 2. By reducing the number of types of the component (A), it is possible to reduce the complication of a process step in producing a nonaqueous electrolyte solution.

<Method for Producing Component (A)>

Next, a method for producing a component (A) will be described below by way of the case where the component (A) is a monofluorophosphate ester salt (i.e., the case where X in the chemical formula (1) is a fluorine atom) as an example.

A method for producing a monofluorophosphate ester salt includes the step A of subjecting a monohalophosphoric acid diester to a fluorination treatment to produce a monofluorophosphoric acid diester, and the step B of reacting the monofluorophosphoric acid diester with a halide to produce a monofluorophosphoric acid ester.

The monohalophosphoric acid diester used as a raw material in the step A is represented by the following chemical formula (7).

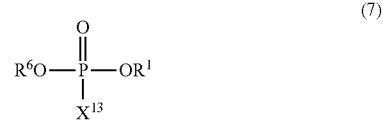

(7)

In the chemical formula (7), $R^1$ is the same as $R^1$ in the chemical formula (1) and is as already mentioned above. $R^6$ in the chemical formula (7) is the same as IV in the chemical formula (1). Accordingly, $R^6$ is selected from the functional group listed in the description of IV. $R^1$ and $R^6$ may be the same or different from each other. X" represents a halogen atom other than a fluorine atom F.

Fluorination of the monohalophosphoric acid diester by a fluorination treatment can be performed, for example, by bringing into contact with potassium fluoride or the like as a fluorinating agent in an organic solvent. Whereby, a reaction as shown by the following chemical scheme (8) occurs, thus enabling the production of a monofluorophosphoric acid diester.

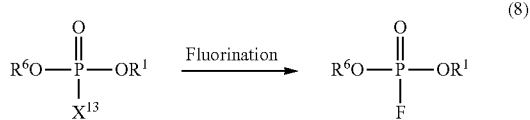

(8)

There is no particular limitation on the reaction initiation temperature at which a reaction between the monohalophosphoric acid diester and the fluorinating agent is initiated in a nonaqueous solvent (in an organic solvent) as long as the reaction proceeds, and the reaction initiation temperature may be appropriately set according to the reactive specifies.

The reaction initiation temperature is usually in a range of 0° C. to 200° C., preferably 20 to 150° C. from the viewpoint of the reactivity, and more preferably 40° C. to 120° C. By setting the reaction initiation temperature at 0° C. or higher, it is possible to prevent the reaction rate from being remarkably attenuated. By setting the reaction initiation temperature at 200° C. or lower, it is possible to suppress energy loss by using excessive energy. There is no particular limitation on the method for adjusting the reaction initiation temperature, and when the reaction initiation temperature is adjusted by cooling to be set in the above temperature range, it is possible to control the temperature by ice-cooling a reaction vessel added with the monohalophosphoric acid diester and the fluorinating agent. In the case of controlling by heating so as to set the reaction starting temperature in the above temperature range, it is possible to control the temperature by an oil bath or the like set at an arbitrary temperature.

The solvent used for reacting the monohalophosphoric acid diester with the fluorinating agent in a nonaqueous solvent is preferably an aprotic solvent. Inhibition of the fluorination reaction can be prevented by using an aprotic solvent. When using the protic solvent, the monohalophosphoric acid diester and the protonic solvent might cause a halogen exchange reaction. When such a nucleophilic fluorination reaction is performed, the hydrogen atom in the aprotic solvent and the fluorine anion of the fluorinating agent significantly degrade fluorination ability due to an influence of hydrogen bond. Monohalophosphoric acid diester can also be used as a solvent.

The aprotic solvent is not particularly limited, and examples thereof include nitriles, esters, ketones, ethers, halogenated hydrocarbons and the like.

The nitriles are not particularly limited, and examples thereof include acetonitrile and propionitrile. The esters are not particularly limited, and examples thereof include dimethyl carbonate, diethyl carbonate, ethyl methyl carbonate, ethylene carbonate, propylene carbonate, ethyl acetate, methyl acetate, butyl acetate and the like. The ketones are not particularly limited, and examples thereof include acetone, methyl ethyl ketone, methyl isobutyl ketone, cyclohexanone, and the like. The ethers are not particularly limited, and examples thereof include diethyl ether, tetrahydrofuran, ethylene glycol and the like. The halogenated hydrocarbon is not particularly limited, and examples thereof include dichloromethane, chloroform and the like. Examples of the other aprotic solvent include nitromethane, nitroethane, dimethylformamide and the like. These aprotic solvents can be used alone or can be used in combination of two kinds or more thereof.

The fluorinating agent used in the reaction between the monohalophosphoric acid diester and the fluorinating agent is not particularly limited, and examples thereof include an alkali metal fluoride, an alkaline earth metal fluoride, an onium fluoride and the like.

The alkali metal fluoride is not particularly limited, and examples thereof include lithium fluoride, sodium fluoride, potassium fluoride, rubidium fluoride, cesium fluoride and the like. The alkaline earth metal fluoride is not particularly limited, and examples thereof include beryllium fluoride, magnesium fluoride, calcium fluoride, strontium fluoride, barium fluoride and the like. The onium fluoride is not particularly limited, and examples thereof include triethylamine trihydrofluoride salt, triethylamine pentafluoride salt, pyridine hydrofluoride salt, tetrabutylammonium fluoride and the like. These fluorinating agents can be used alone or can be used in combination of two kinds or more thereof.

The step B is the step of reacting a monofluorophosphoric acid diester with the halide to produce a monofluorophosphoric acid ester salt.

The halide is represented by the chemical formula $M^{n+}X^{14}n$ ($M^{n+}$ represents at least one selected from the group consisting of an alkali metal ion, an alkaline earth metal ion, a transition metal ion, a rare earth element ion, a zinc ion, an aluminum ion, a gallium ion, a zinc ion, an indium ion, a germanium ion, a tin ion, a lead ion and an onium ion, $X^{14}$ represents a halogen atom of F, Cl, Br or I, and n represents a valence number).

Here, since $M^{n+}$ in the halide is as already described, detailed description thereof will be omitted. n in the halide represents a valence as in the case of the general formula (1).

The reaction of the monofluorophosphoric acid diester and the halide in the step B is as represented by the following chemical reaction formulas (9) and (10).

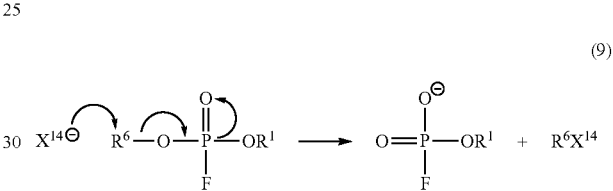

(9)

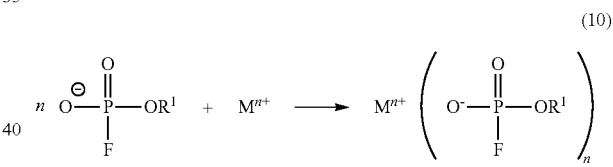

(10)

That is, halogen of halide nucleophilically attacks $R^6$ of the monofluorophosphate ester, whereby, a monofluorophosphate anion containing $R^1$ is eliminated to form an alkyl halide represented by $R^6X^{14}$. It is estimated that the monofluorophosphate anion forms a salt with a counter cation of the halide, thereby forming a monofluorophosphoric acid ester salt.

Here, when reacting the halide with the monofluorophosphoric acid diester, two leaving groups each represented by the following chemical formulas can be formed:

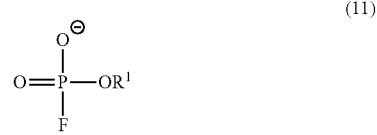

(11)

in which $R^1$ represents a hydrocarbon group having 1 to 20 carbon atoms, or a hydrocarbon group having 1 to 20 carbon atoms and having at least any one of a halogen atom, a heteroatom or an unsaturated bond, and

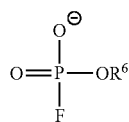

(12)

in which $R^6$ represents a hydrocarbon group having 1 to 20 carbon atoms, or a hydrocarbon group having 1 to 20 carbon atoms and having at least any one of a halogen atom, a heteroatom or an unsaturated bond.

In the case of reacting the halide with the monofluorophosphoric acid diester to produce a monofluorophosphoric acid ester salt, when IV and $R^6$ are different, it is required that a monofluorophosphoric acid ester anion represented by the chemical formula (11) has higher leaving ability than that of a monofluorophosphoric acid ester anion represented by the chemical formula (12). Whereby, it is possible to obtain a monofluorophosphoric acid ester salt including $R^1$ of the present embodiment.

The leaving ability of the monofluorophosphphosphoric acid anion which is a leaving group and is represented by the chemical formula (11) or (12) is roughly estimated, for example, by the pKa value of each proton, is roughly estimated, for example, by the pKa value of each protonated form. Specifically, the pKa value of the proton form of the monofluorophosphphosphoric acid anion represented by the chemical formula (11), i.e., the monofluorophosphoric acid ester, is preferably smaller than that of the proton form of the monofluorophosphphosphoric acid anion represented by the chemical formula (12). The pKa value can be estimated from, for example, Bordwell pKa Table and the like. Alternatively, it can be estimated that those having an electron withdrawing group in a leaving group have high leaving ability.

In the case of reacting the halide with the monofluorophosphoric acid diester in the other nonaqueous solvent to produce a monofluorophosphoric acid ester salt, there is no particular limitation on the amount of the halide and the monofluorophosphoric acid diester used as long as the desired compound can be obtained, Is not particularly limited. Usually, the monofluorophosphoric acid diester is used in an amount of 0.5 equivalent to 5 equivalents, preferably 0.9 equivalent to 4 equivalents, and more preferably 0.95 equivalent to 3.3 equivalents, based on 1 equivalent of the halide. By setting the amount of the monofluorophosphoric acid diester at 0.5 equivalent or more, it is possible to prevent deterioration of the reactivity between the halide and the monofluorophosphoric acid diester and to suppress the unreacted hydroxide from remaining. As a result, reduction in purity of the monofluorophosphate salt can be suppressed. When the amount of the monofluorophosphoric acid diester is more than 5 equivalents, it becomes necessary to use the production time and energy required for distilling off the monofluorophosphoric acid diester, leading to industrial disadvantage.

There is no particular limitation on the reaction initiation temperature at which a reaction between the halide and the monofluorophosphoric acid diester is initiated in the other nonaqueous solvent, as long as the reaction proceeds, and the reaction initiation temperature may be appropriately set according to reactive species. Usually, the reaction initiation temperature is in a range of 0° C. to 200° C., preferably 20 to 150° C. from the viewpoint of the reactivity, and more preferably 40° C. to 120° C. By setting the reaction initiation temperature at 0° C. or higher, it is possible to prevent the reaction rate from being remarkably attenuated. By setting the reaction initiation temperature at 200° C. or lower, it is possible to suppress energy loss due to use of excessive energy. There is no particular limitation on the method for adjusting the reaction initiation temperature, and when the reaction initiation temperature is adjusted by cooling to be set in the above temperature range, it is possible to control the temperature by ice-cooling a reaction vessel added with the halide and the monohalophosphoric acid diester In the case of controlling by heating so as to set the reaction starting temperature in the above temperature range, it is possible to control the temperature by an oil bath or the like set at an arbitrary temperature.

There is no particular limitation on the reaction time in the case of reacting the halide and the monofluorophosphoric acid diester in the other nonaqueous solvent, and the reaction time may be appropriately set according to reactive species. Usually, the reaction time is in a range of 30 minutes to 20 hours, preferably 30 minutes to 15 hours from the viewpoint of industrial production, and more preferably 30 minutes to 10 hours.

In the reaction between the halide and the monofluorophosphoric acid diester, the monofluorophosphoric acid diester can be used as a reaction solvent, in addition to the other nonaqueous solvent. In this case, there is no particular limitation on the reaction initiation temperature at which a reaction between the halide and the monofluorophosphoric acid diester is initiated, as long as the reaction proceeds, and the reaction initiation temperature may be appropriately set according to reactive species. Usually, the reaction initiation temperature is in a range of 0° C. to 200° C., preferably 20° C. to 150° C. from the viewpoint of the reactivity, and more preferably 40° C. to 120° C. The reaction time is also not particularly limited, and it may be appropriately set according to reactive species. Usually, the reaction time is in a range of 30 minutes to 20 hours, preferably 30 minutes to 15 hours from the viewpoint of industrial production, and more preferably 30 minutes to 10 hours.

The other nonaqueous solvent (organic solvent) is not particularly limited as long as there is no hindrance to react with other reactants and products. Specific examples thereof include alcohols, nitriles, esters, ketones, ethers, halogenated hydrocarbons and the like. These solvents can be used alone or can be used in combination of two kinds or more thereof.

The alcohols are not particularly limited, and examples thereof include but are not particularly limited to, methanol, ethanol, propanol, butanol, isopropyl alcohol, pentanol, hexanol, heptanol, octanol, 2-iodoethanol, 2-bromoethanol, 2-chloroethanol, 2-fluoroethanol, 1,2-diiodoethanol, 1,2-dibromoethanol, 1,2-dichloroethanol, 1,2-difluoroethanol, 2,2-diiodoethanol, 2,2-dibromoethanol, 2,2-dichloroethanol, 2,2-difluoroethanol, 2,2,2-tribromoethanol, 2,2,2-trichloroethanol, 2,2,2-trifluoroethanol, 1,1,1,3,3,3-hexafluoro-2-propanol and the like. These alcohols can be used alone or can be used in combination of two kinds or more thereof.

The nitriles are not particularly limited, and examples thereof include acetonitrile, propionitrile and the like. These alcohols can be used alone or can be used in combination of two kinds or more thereof.

The esters are not particularly limited, and examples thereof include dimethyl carbonate, diethyl carbonate, ethyl methyl carbonate, ethylene carbonate, propylene carbonate, ethyl acetate, methyl acetate, butyl acetate and the like. These esters can be used alone or can be used in combination of two kinds or more thereof.

The ketones are not particularly limited, and examples thereof include acetone, methyl ethyl ketone, methyl isobutyl ketone, cyclohexanone and the like. These ketones can be used alone or can be used in combination of two kinds or more thereof.

The ethers are not particularly limited, and examples thereof include diethyl ether, tetrahydrofuran, dimethoxyethane and the like. These ethers can be used alone or can be used in combination of two kinds or more thereof.

The halogenated hydrocarbon is not particularly limited, and examples thereof include dichloromethane, chloroform and the like. These halogenated hydrocarbons can be used alone or can be used in combination of two kinds or more thereof.

Examples of the other nonaqueous solvent (organic solvent) include nitromethane, nitroethane, dimethylformamide and the like.

The amount of the other nonaqueous solvent (organic solvent) used is preferably 1 time or more, more preferably 1 time to 200 times, still more preferably 1 time to 100 times, and particularly preferably 1 time to 50 times, the mass of the monofluorophosphoric acid diester. By setting the amount of the organic solvent at 1 time or more, it is possible to prevent deterioration of the reactivity of the phosphoric acid triester with the hydroxide and to suppress the yield of the phosphoric acid diester salt and a decrease in purity. Although the upper limit of the amount of organic solvent is not particularly limited, when an organic solvent is used in an excessive amount relative to the monofluorophosphoric acid diester, energy more than necessary might be required, leading to industrial disadvantage. Therefore, it is preferred that the upper limit of the amount of organic solvent is appropriately set according to reactive species.

When an organic solvent is used as a reaction solvent, the order of the addition of the halide and the monofluorophosphoric acid diester is not particularly limited. When using the monofluorophosphoric acid diester is used as the reaction solvent, the order of the addition of the halide and the monofluorophosphoric acid diester is not particularly limited.

The monofluorophosphoric acid ester salt obtained by the method of the present embodiment is subjected to cation exchange utilizing solubility or cation exchange using an ion exchange resin or the like, thus making possible to produce a monofluorophosphoric acid ester having a desired different type cation.

A monofluorophosphoric acid ester can also be produced by reacting the monofluorophosphate salt ester obtained by the method of the present embodiment with Arrhenius acid such as sulfuric acid or hydrochloric acid. It is also possible to obtain a monofluorophosphoric acid ester by performing proton exchange using an ion exchange resin. It is also possible to produce a monofluorophosphoric acid ester salt by reacting the monofluorophosphoric acid ester obtained by these methods with a halide or a hydroxide.

In the present embodiment, immediately after the step of producing a monofluorophosphoric acid ester salt, the step of purifying the monofluorophosphoric acid ester salt may be performed. Immediately after the step of producing a monofluorophosphoric acid ester salt having another cation, the purification can also be permed by cation exchange of the monofluorophosphoric acid ester salt to. Immediately after reacting the monofluorophosphoric acid ester with the halide to produce a monofluorophosphoric acid ester salt, the purification can also be performed. The purification method is not particularly limited, and it is possible to employ, for example, a method using an operation such as distillation or drying, or a method using an adsorbent such as activated carbon or ion exchange resin. By performing these purifications, the purity of the monofluorophosphoric acid ester salt can be increased.

<Component (B)>

In the nonaqueous electrolytic solution of the present embodiment, at least one component (B) mentioned below may be further contained as an additive. Whereby, it is possible to further improve the cycle characteristics in higher-temperature environments.

The nonaqueous electrolytic solution containing the component (A) may contain the following component (B).

The component (B) includes any of the following components (b1) and (b2).

Component (b1): one boron complex salt.

Component (b2): at least one compound selected from the group consisting of a boric acid ester, an acid anhydride, a cyclic carbonate having an unsaturated bond, a cyclic carbonate having a halogen atom, a cyclic sulfonic acid ester, amines having an acetoacetyl group and a phosphorus compound.

[Boron Complex Salt]

Specifically, the boron complex salt of the component (b1) is represented by the following chemical formula (2).

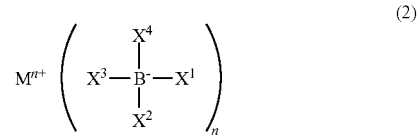

In the chemical formula (2), $M^{n+}$ is as already described and represents any one selected from the group consisting of a hydrogen ion, an alkali metal ion, an alkaline earth metal ion, an aluminum ion, a transition metal ion and an onium ion. Therefore, detailed description thereof will be omitted.

In the chemical formula (2), $X^1$ to $X^4$ are independent of each other, and optionally selected one or more combinations form a cyclic structure of —OOC—Y—COO—, —O—Y—O— or —OOC—Y—O— in which Y represents a hydrocarbon group having 0 to 20 carbon atoms, preferably 0 to 10 carbon atoms, and more preferably 0 to 10 carbon atoms, or a hydrocarbon group having 0 to 20 carbon atoms, preferably 0 to 10 carbon atoms, and more preferably 0 to 5 carbon atoms and having a heteroatom, an unsaturated bond or a cyclic structure. When $X^1$ to $X^4$ have two of any one of the cyclic structures of —OOC—Y—COO—, —O—Y—O—, or —OOC—Y—O—, each Y may be different from each other. Here, the hetero atom means an oxygen atom, a nitrogen atom or a sulfur atom.

Y is not particularly limited, and specific examples thereof include linear alkylene groups such as a methylene group, an ethylene group, a propylene group, a butylene group, a pentylene group, a hexylene group, a hepthylene group, an octhylene group and a nonylene group; halogen-containing linear alkylene groups such as an iodomethylene group, a diiodomethylene group, a bromomethylene group, a dibromomethylene group, a fluoromethylene group, a difluoromethylene group, an iodoethylene group, a 1,1-diiodoethylene group, a 1,2-diiodoethylene group, a triiodoethylene group, a tetraiodoethylene group, a chloroethylene group, a 1,1-dichloroethylene group, a 1,2-dichloroethylene group, a trichloroethylene group, a tetrachloroethylene group, a fluoroethylene group, a 1,1-difluoroethylene group, a 1,2-difluoroethylene group, a trifluoroethylene group and a tetrafluoroethylene group; cyclic hydrocarbon groups such as a cyclohexylene group, a phenylene group, a benzylene group, a naphthylene group, an anthracylene group, a naphthacylene group and a pentacylene group; and those which are partially or wholly substituted with halogen.

When the carbon number of Y is 0, —OOC—Y—COO— is —OOC—COO— and represents an oxalate group. When Y is a 1,2-phenylene group, —O—Y—O— represents a benzene dioleate group, and —O—Y—COO— represents a salicylate group.

$X^1$ to $X^4$ each independently may be a halogen atom; an alkyl group having 0 to 20 carbon atoms, preferably 0 to 10 carbon atoms, and more preferably 0 to 5 carbon atoms; an alkoxy group having 0 to 20 carbon atoms, preferably 0 to 10 carbon atoms, and more preferably 0 to 5 carbon atoms; an alkyl group having 0 to 20 carbon atoms, preferably 0 to 10 carbon atoms, and more preferably 0 to 5 carbon atoms, and having at least one of a halogen atom, a heteroatom, an unsaturated bond or a cyclic structure; or an alkoxy group having 0 to 20 carbon atoms, preferably 0 to 10, and more preferably 0 to 5, and having at least one of a halogen atom, a heteroatom, an unsaturated bond or a cyclic structure. Here, the halogen atom means a fluorine atom, a chlorine atom, a bromine atom or an iodine atom. The heteroatom means an oxygen atom, a nitrogen atom or a sulfur atom.

Specific examples of the above-mentioned $X^1$ to $X^4$ include chain alkyl groups such as a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; halogen-containing chain alkyl groups such as an iodomethyl group, a bromomethyl group, a chloromethyl group, a fluoromethyl group, a diiodomethyl group, a dibromomethyl group, a dichloromethyl group, a difluoromethyl group, a triiodomethyl group, a tribromomethyl group, a trichloromethyl group, a trifluoromethyl group, a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a 1,1,1,3,3-hexafluoro-2-propyl group; halogen-containing cyclic alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and 3-cyclohexenyl group; chain alkynyl groups such as a 2-propynyl group, a 1-butynyl group, a 2-butynyl group, a 3-butynyl group, a 1-pentynyl group, a 2-pentynyl group, a 3-pentynyl group and 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; chain alkoxy groups such as a methoxy group, an ethoxy group, a propoxy group, a butoxy group, a pentoxy group and a hexoxy group; cyclic alkoxy groups such as a cyclopentoxy group and a cyclohexoxy group; halogen-containing chain alkyl groups such as a 2-iodoethoxy group, a 2-bromoethoxy group, a 2-chloroethoxy group, a 2-fluoroethoxy group, a 1,2-diiodoethoxy group, a 1,2-dibromoethoxy group, a 1,2-dichloroethoxy group, a 1,2-difluoroethoxy group, a 2,2-diiodoethoxy group, a 2,2-dibromoethoxy group, a 2,2-dichloroethoxy group, a 2,2-difluoroethoxy group, a 2,2,2-tribromoethoxy group, a 2,2,2-trichloroethoxy group, a 2,2,2-trifluoroethoxy group and a 1,1,1,3,3-hexafluoro-2-propoxy group; halogen-containing cyclic alkyl groups such as a 2-iodocyclohexoxy group, a 2-bromocyclohexoxy group, a 2-chlorocyclohexoxy group and a 2-fluorocyclohexoxy group; chain alkenylalkoxy groups such as a 2-propexy group, an isopropexy group, a 2-butexy group and a 3-butexy group; cyclic alkenylalkoxy groups such as a 2-cyclopentexy group, a 2-cyclohexexy group and a 3-cyclohexexy group; chain alkynylalkoxy groups such as a 2-propynoxy group, a 1-butynoxy group, a 2-butynoxy group, a 3-butynoxy group, a 1-pentynoxy group, a 2-pentynoxy group, a 3-pentynoxy group and a 4-pentynoxy group; phenoxy groups such as a phenoxy group, a 3-methylphenoxy group, a 4-methylphenoxy group and a 3,5-dimethylphenoxy group; halogen-containing phenoxy groups such as a 2-iodophenoxy group, a 2-bromophenoxy group, a 2-chlorophenoxy group, a 2-fluorophenoxy group, a 3-iodophenoxy group, a 3-bromophenoxy group, a 3-chlorophenoxy group, a 3-fluorophenoxy group, a 4-iodophenoxy group, a 4-bromophenoxy group, a 4-chlorophenoxy group, a 4-fluorophenoxy group, a 3,5-diiodophenoxy group, a 3,5-dibromophenoxy group, a 3,5-dichlorophenoxy group and a 3,5-difluorophenoxy group.

$X^1$ to $X^4$ are independent of each other and may be the same or different. The group of the functional groups mentioned above is merely an exemplification, and the functional group is not limited thereto.

Specific examples of the boron complex salt represented by the chemical formula (2) include lithium bis(oxalato)borate, lithium bismalonatoborate, lithium bissalicylatoborate, lithium bis[1,2'-benziolato(2)-O,O']borate, lithium oxalatomalonatoborate, lithium oxalatosalicylatoborate, lithium oxalato[1,2'-benziolato(2)-O,O]borate, lithium diiodooxalatoborate, lithium dibromooxalatoborate, lithium dichlorooxalatoborate, lithium difluorooxalatoborate, lithium iodochlorooxalatoborate, lithium iodobromooxalatoborate, lithium iodofluorooxalatoborate, lithium bromochlorooxalatoborate, lithium bromofluorooxalatoborate, lithium chlorofluorooxalatoborate, lithium diiodomalonatoborate, lithium dibromomalonatoborate, lithium dichloromalonatoborate, lithium difluoromalonatoborate, lithium iodochloromalonatoborate, lithium iodobromomalonatoborate, lithium iodofluoromalonatoborate, lithium bromochloromalonatoborate, lithium bromofluoromalonatoborate, lithium chlorofluoromalonatoborate, lithium diiodosalicylatoborate, lithium dibromosalicylatoborate, lithium dichlorosalicylatoborate, lithium difluorosalicylatoborate, lithium iodochlorosalicylatoborate, lithium iodobromosalicylatoborate, lithium iodofluorosalicylatoborate, lithium bromochlorosalicylatoborate, lithium bromofluorosalicylatoborate, lithium chlorofluorosalicylatoborate, lithium diiodo[1,2'-benziolato(2)-O,O]borate, lithium dibromo[1,2'-benziolato(2)-O,O']borate, lithium dichloro[1,2'-benziolato(2)-O,O']borate, lithium difluoro[1,2'-benziolato(2)-O,O']borate, lithium iodochloro[1,2'-benziolato(2)-O,O']borate, lithium iodobromo[1,2'-benziolato(2)-O,O']borate, lithium iodofluoro[1,2'-benziolato(2)-O,O]borate, lithium bromochloro[1,2'-benziolato(2)-O,O']borate, lithium bromofluoro[1,2'- benziolato(2)-O,O']borate, lithium chlorofluoro[1,2'-benziolato(2)-O,O']borate, lithium tetraiodoborate, lithium tetrabromoborate, lithium tetrachloroborate, lithium tetrafluoroborate, lithium iodotribromoborate, lithium iodotrichloroborate, lithium iodotrifluoroborate, lithium diiododibromoborate, lithium diiododichloroborate, lithium diiododifluoroborate, lithium triiodobromoborate, lithium triiodochloroborate, lithium triiodofluoroborate, lithium bromotrichloroborate, lithium bromotrifluoroborate, lithium dibromodichloroborate, lithium dibromodifluoroborate, lithium tribromochloroborate, lithium tribromofluoroborate, lithium chlorotrifluoroborate, lithium dichlorodifluoroborate, lithium chlorotrifluoroborate, lithium iodobromochlorofluoroborate, lithium tetramethylborate, lithium tetraethylborate, lithium tetraphenylborate, lithium tetramethoxyborate, lithium tetraethoxyborate, lithium tetraphenoxyborate, lithium ethyldimethylphenylborate, lithium butylethylmethylphenylborate, lithium ethoxydimethoxyphenoxyborate, lithium dimethyloxalatoborate, lithium dimethylmalonatoborate, lithium dimethylsalicylatoborate, lithium dimethyl[1,2'-benziolato(2)-O,O']borate, lithium ethylmethyloxalatoborate, lithium phenylmethyloxalatoborate, lithium iodomethyloxalatoborate, lithium bromomethyloxalatoborate, lithium chloromethyloxalatoborate, lithium fluoromethyloxalatoborate, lithium iodoethyloxalatoborate, lithium bromoethyloxalatoborate, lithium chloroethyloxalatoborate, lithium fluoroethyloxalatoborate, lithium ethoxymethoxyoxalatoborate, lithium iodomethoxyoxalatoborate, lithium bromomethoxyoxalatoborate, lithium chloromethoxyoxalatoborate, lithium fluoromethoxyoxalatoborate and the like.

Specific examples of the boron complex salt represented by the chemical formula (2) include sodium bisoxalatoborate, sodium bismalonatoborate, sodium bissalicylatoborate, sodium bis[1,2'-benziolato(2)-O,O']borate, sodium oxalatomalonatoborate, sodium oxalatosalicylatoborate, sodium oxalato[1,2'-benziolato(2)-O,O]borate, sodium diiodooxalatoborate, sodium dibromooxalatoborate, sodium dichlorooxalatoborate, sodium difluorooxalatoborate, sodium iodochlorooxalatoborate, sodium iodobromooxalatoborate, sodium iodofluorooxalatoborate, sodium bromochlorooxalatoborate, sodium bromofluorooxalatoborate, sodium chlorofluorooxalatoborate, sodium diiodomalonatoborate, sodium dibromomalonatoborate, sodium dichloromalonatoborate, sodium difluoromalonatoborate, sodium iodochloromalonatoborate, sodium iodobromomalonatoborate, sodium iodofluoromalonatoborate, sodium bromochloromalonatoborate, sodium bromofluoromalonatoborate, sodium chlorofluoromalonatoborate, sodium diiodosalicylatoborate, sodium dibromosalicylatoborate, sodium dichlorosalicylatoborate, sodium difluorosalicylatoborate, sodium iodochlorosalicylatoborate, sodium iodobromosalicylatoborate, sodium iodofluorosalicylatoborate, sodium bromochlorosalicylatoborate, sodium bromofluorosalicylatoborate, sodium chlorofluorosalicylatoborate, sodium diiodo[1,2'-benziolato(2)-O,O']borate, sodium dibromo[1,2'-benziolato(2)-O,O']borate, sodium dichloro[1,2'-benziolato(2)-O,O']borate, sodium difluoro[1,2'-benziolato(2)-O,O']borate, sodium iodochloro[1,2'-benziolato(2)-O,O']borate, sodium iodobromo[1,2'-benziolato(2)-O,O']borate, lithium iodofluoro[1,2'-benziolato(2)-O,O]borate, sodium bromochloro[1,2'-benziolato(2)-O,O']borate, sodium bromofluoro[1,2'-benziolato(2)-O,O']borate, sodium chlorofluoro[1,2'-benziolato(2)-O,O']borate, sodium tetraiodoborate, sodium tetrabromoborate, sodium tetrachloroborate, sodium tetrafluoroborate, sodium iodotribromoborate, sodium iodotrichloroborate, sodium iodotrifluoroborate, sodium diiododibromoborate, sodium diiododichloroborate, sodium diiododifluoroborate, sodium triiodobromoborate, sodium triiodochloroborate, sodium triiodofluoroborate, sodium bromotrichloroborate, sodium bromotrifluoroborate, sodium dibromodichloroborate, sodium dibromodifluoroborate, sodium tribromochloroborate, sodium tribromofluoroborate, sodium chlorotrifluoroborate, sodium dichlorodifluoroborate, sodium chlorotrifluoroborate, sodium iodobromochlorofluoroborate, sodium tetramethylborate, sodium tetraethylborate, sodium tetraphenylborate, sodium tetramethoxyborate, sodium tetraethoxyborate, sodium tetraphenoxyborate, sodium ethyldimethylphenylborate, sodium butylethylmethylphenylborate, sodium ethoxydimethoxyphenoxyborate, sodium dimethyloxalatoborate, sodium dimethylmalonatoborate, sodium dimethylsalicylatoborate, sodium dimethyl[1,2'-benziolato(2)-O,O]borate, sodium ethylmethyloxalatoborate, sodium phenylmethyloxalatoborate, sodium iodomethyloxalatoborate, sodium bromomethyloxalatoborate, sodium chloromethyloxalatoborate, sodiumfluoromethyloxalatoborate, sodium iodoethyloxalatoborate, sodium bromoethyloxalatoborate, sodium chloroethyloxalatoborate, sodium fluoroethyloxalatoborate, sodium ethoxymethoxyoxalatoborate, sodium iodomethoxyoxalatoborate, sodium bromomethoxyoxalatoborate, sodium chloromethoxyoxalatoborate, sodium fluoromethoxyoxalatoborate Specific examples of the boron complex salt represented by the chemical formula (2) include triethylmethylammonium bisoxalatoborate, triethylmethylammonium bismalonatoborate, triethylmethylammonium bissalicylatoborate, triethylmethylammonium bis[1,2'-benziolato(2)-O,O']borate, triethylmethylammonium oxalatomalonatoborate, triethylmethylammonium oxalatosalicylatoborate, triethylmethylammonium oxalato[1,2'-benziolato(2)-O,O]borate, triethylmethylammonium diiodooxalatoborate, triethylmethylammonium dibromooxalatoborate, triethylmethylammonium dichlorooxalatoborate, triethylmethylammonium difluorooxalatoborate, triethylmethylammonium iodochlorooxalatoborate, triethylmethylammonium iodobromooxalatoborate, triethylmethylammonium iodofluorooxalatoborate, triethylmethylammonium bromochlorooxalatoborate, triethylmethylammonium bromofluorooxalatoborate, triethylmethylammonium chlorofluorooxalatoborate, triethylmethylammonium diiodomalonatoborate, triethylmethylammonium dibromomalonatoborate, triethylmethylammonium dichloromalonatoborate, triethylmethylammonium difluoromalonatoborate, triethylmethylammonium iodochloromalonatoborate, triethylmethylammonium iodobromomalonatoborate, triethylmethylammonium iodofluoromalonatoborate, triethylmethylammonium bromochloromalonatoborate, triethylmethylammonium bromofluoromalonatoborate, triethylmethylammonium chlorofluoromalonatoborate, triethylmethylammonium diiodosalicylatoborate, triethylmethylammonium dibromosalicylatoborate, triethylmethylammonium dichlorosalicylatoborate, triethylmethylammonium difluorosalicylatoborate, triethylmethylammonium iodochlorosalicylatoborate, triethylmethylammonium iodobromosalicylatoborate, triethylmethylammonium iodofluorosalicylatoborate, triethylmethylammonium bromochlorosalicylatoborate, triethylmethylammonium bromofluorosalicylatoborate, triethylmethylammonium chlorofluorosalicylatoborate, triethylmethylammonium diiodo[1,2'-benziolato(2)-O,O']borate, triethylmethylammonium dibromo[1,2'-benziolato(2)-O,O']borate, triethylmethylammonium dichloro[1,2'-benziolato(2)-O,O']borate, triethylmethylammonium difluoro[1,2'-benziolato(2)-O,O']borate, triethylmethylammonium iodochloro[1,2'-benziolato(2)-O,O']borate, triethylmethylammonium iodobromo[1,2'-benziolato(2)-O,O']borate, triethylmethylammonium iodofluoro[1,2'-benziolato(2)-O,O']borate, triethylmethylammonium bromochloro[1,2'-benziolato(2)-O,O']borate, triethylmethylammonium bromofluoro[1,2'-benziolato(2)-O,O']borate, triethylmethylammonium chlorofluoro[1,2'-benziolato(2)-O,O']borate, triethylmethylammonium tetraiodoborate, triethylmethylammonium tetrabromoborate, triethylmethylammonium tetrachloroborate, triethylmethylammonium tetrafluoroborate, triethylmethylammonium iodotribromoborate, triethylmethylammonium iodotrichloroborate, triethylmethylammonium iodotrifluoroborate, triethylmethylammonium diiododibromoborate, triethylmethylammonium diiododichloroborate, triethylmethylammonium diiododifluoroborate, triethylmethylammonium triiodobromoborate, triethylmethylammonium triiodochloroborate, triethylmethylammonium triiodofluoroborate, triethylmethylammonium bromotrichloroborate, triethylmethylammonium bromotrifluoroborate, triethylmethylammonium dibromodichloroborate, triethylmethylammonium dibromodifluoroborate, triethylmethylammonium tribromochloroborate, triethylmethylammonium tribromofluoroborate, triethylmethylammonium chlorotrifluoroborate, triethylmethylammonium dichlorodifluoroborate, triethylmethylammonium chlorotrifluoroborate, triethylmethylammonium iodobromochlorofluoroborate, triethylmethylammonium tetramethylborate, triethylmethylammonium tetraethylborate, triethylmethylammonium tetraphenylborate, triethylmethylammonium tetramethoxyborate, triethylmethylammonium tetraethoxyborate, triethylmethylammonium tetraphenoxyborate, triethylmethylethylammonium dimethylphenylborate, triethylmethylammonium butylethylmethylphenylborate, triethylmethylammonium ethoxydimethoxyphenoxyborate, triethylmethylammonium dimethyloxalatoborate, triethylmethylammonium dimethylmalonatoborate, triethylmethylammonium dimethylsalicylatoborate, triethylmethylammonium dimethyl[1,2'-benziolato(2)-O,O']borate, triethylmethylammonium thylmethyloxalatoborate, triethylmethylammonium phenylmethyloxalatoborate, triethylmethylammonium iodomethyloxalatoborate, triethylmethylammonium bromomethyloxalatoborate, triethylmethylammonium chloromethyloxalatoborate, triethylmethylammonium fluoromethyloxalatoborate, triethylmethylammonium iodoethyloxalatoborate, triethylmethylammonium bromoethyloxalatoborate, triethylmethylammonium chloroethyloxalatoborate, triethylmethylammonium fluoroethyloxalatoborate, triethylmethylammonium ethoxymethoxyoxalatoborate, triethylmethylammonium iodomethoxyoxalatoborate, triethylmethylammonium bromomethoxyoxalatoborate, triethylmethylammonium chloromethoxyoxalatoborate, triethylmethylammonium fluoromethoxyoxalatoborate and the like.

Specific examples of the boron complex salt represented by the chemical formula (2) mentioned above is merely an exemplification, and the boron complex salt is not limited thereto.

From the viewpoint of ease of availability, the boron complex salt is preferably lithium bis(oxalato)borate, triethylmethylammonium bisoxalatoborate, lithium bissalicylatoborate, or lithium bis[1,2'-benziolato(2)-O,O']borate.

n in the chemical formula (2) represents a valence as in the case of the chemical formula (1).

[Boric Acid Ester]

There is no particular limitation on the kind of the boric acid ester in the component (b2) as long as it does not impair the characteristics of the nonaqueous electrolyte solution of the present embodiment and the secondary battery using the same, and various boric acid esters can be selected. Specific examples of the boric acid esters include trimethyl borate, triethyl borate, triisopropyl borate, tributyl borate, tripentyl borate, trihexyl borate, triheptyl borate, triphenyl borate, tris(2,2,2-iodoethyl) diborate, tris(2,2,2-tribromoethyl) borate, tris(2,2,2-trichloroethyl) borate, tris(2,2,2-trifluoroethyl) borate, tris(4-iodophenyl) borate, tris(4-bromophenyl) borate, tris(4-chlorophenyl) borate, tris(4-fluorophenyl) borate, diethyl methyl borate, ethyl dimethyl borate and the like.

[Acid Anhydride]

There is no particular limitation on the kind of the acid anhydride in the component (b2) as long as it does not impair the characteristics of the nonaqueous electrolyte solution of the present embodiment and the secondary battery using the same, and various acid anhydrides can be selected. Specific examples of the acid anhydrides include linear carboxylic acid anhydrides such as acetic anhydride, propionic anhydride, butylic anhydride, valeric anhydride, hexanoic anhydride, heptanoic anhydride, octanoic anhydride, nonanoic anhydride, decanoic anhydride, eicosanoic anhydride, docosanoic anhydride, benzoic anhydride, 4-methoxybenzoic anhydride, diphenylacetic anhydride, crotonic anhydride, cyclohexanecarboxylic anhydride, elaidic anhydride, isobutyric anhydride, isovaleric anhydride, lauric anhydride, linoleic anhydride, myristic anhydride, angelic anhudride, chlorodifluoroacetic anhyride, trichloroacetic anhyride, difluoroacetic anhyride, trifluoroacetic anhyride and 4-trifluoromethylbenzoic anhydride; cyclic carboxylic acid anhydrides such as phthalic anhyride, 3-acetamidophthalic anhyride, 4,4'-carbonyldiphthalic anhyride, 4,4'-biphthalic anhyride, 3-iodophthalic anhyride, 3-bromophthalic anhyride, 3-chlorophthalic anhyride, 3-fluorophthalic anhyride, 4-iodophthalic anhyride, 4-bromophthalic anhyride, 4-chlorophthalic anhyride, 4-chlorophthalic anhyride, 4,5-diiodophthalic anhyride, 4,5-dibromophthalic anhyride, 4,5-dichlorophthalic anhyride, 4,5-difluorophthalic anhyride, 4,4'-sulfonyldiphthalic anhydride, 3-nitrophthalic anhyride, 4-nitrophthalic anhyride, exo-3,6-epoxyhexahydrophthalic anhydride, exo-3,6-epoxy-1,2,3,6-tetrahydrophthalic anhydride, tetraiodophthalic anhyride, tetrachlorophthalic anhyride, tetrafluorophthalic anhyride, 4-tert-butylphthalic anhyride, 4-ethynylphthalic anhyride, 4,4'-(hexafluoroisopropylidene) diphthalic anhyride, succinic anhyride, (R)-(+)-2-acetoxysuccinic anhydride, (S)-(−)-2-acetoxysuccinic anhydride, 2-buten-1-ylsuccinic anhydride, butylsuccinic anhydride, decyl succinic anhydride, 2,3-dimethyl succinic anhydride, 2-dodecene-1-ylsuccinic anhyride, dodecylsuccinic anhydride, octadecenyl succinic anhydride, (2,7-octadien-1-yl) succinic anhydride, n-octylsuccinic anhydride, hexadecylsuccinic anhydride, maleic anhyride, 2,3-bis(2,4,5-trimethyl-3-thienyl)maleic anhyride, 2-(2-carboxyethyl)-3-methylmaleic anhydride, 2,3-dimethylmaleic anhydride, 2,3-diphenylmaleic anhydride, phenylmaleic anhydride, 4-pentene-1,2-dicarboxylic anhydride, 2,3-anthracenedicarboxylic anhydride, bicyclo[2.2.2]oct-5-ene-2,3-dicarboxylic anhydride, 4-bromo-1,8-naphthalenedicarboxylic anhydride, (+/−)-trans-1,2-cyclohexanedicarboxylic anhydride, cis-4-cyclohexene-1,2-dicarboxylic anhydride, 2,5-dibromo-3,4-thiophenedicarboxylic anhydride, 5,6-dihydro-1, 4-dithiin-2,3-dicarboxylic anhydride, 2,2'-biphenyldicarboxylic anhydride, 4-methylcyclohexane-1,2-dicarboxylic anhydride, 3-methyl-4-cyclohexene-1,2-dicarboxylic anhydride, 4-methyl-4-cyclohexene-1,2-dicarboxylic anhydride, 2,3-naphthalenedicarboxylic anhydride, 3,4-thiophenedicarboxylic anhydride, 1,8-naphthalenedicarboxylic anhydride, 5-norbornene-2,3-dicarboxylic anhydride, 1,2-cyclopropane dicarboxylic anhydride, glutaric anhydride, 3,3-pentamethyleneglutaric anhydride, 2,2-dimethylglutaric anhydride, 3,3-dimethylglutaric anhydride, 3-methylglutaric anhydride, 2-phthalimidoglutaric anhydride, 3,3-tetramethyleneglutaric anhydride, N-methylisatoic anhydride, 4-iodoisatoic anhydride, 4-bromoisatoic anhydride, 4-chloroisatoic anhydride, 4-fluoroisatoic anhydride, 5-iodoisatoic anhydride, 5-bromoisatoic anhydride, 5-chloroisatoic anhydride, 5-fluoroisatoic anhydride, itaconic anhyride, caronic anhydride, citraconic anhydride, diglycolic anhydride, 1,2-naphthalic anhydride, pyromellitic dianhydride, het anhydride and 2,2,3,3,4,4-hexafluoropentanedioic anhydride; linear sulfonic acid anhydrides such as trifluoromethanesulfonic anhydride and p-toluenesulfonic anhydride; cyclic sulfonic acid anhydrides such as 2-sulfobenzoic anhydride, tetraiodo-o-sulfobenzoic anhydride, tetrabromo-o-sulfobenzoic anhydride, tetrachloro-o-sulfobenzoic anhydride and tetrafluoro-o-sulfobenzoic anhydride; chain phosphinic acid anhydrides such as diphenyl phosphinic acid; cyclic phosphonic acid anhydrides such as 1-propanephosphonic anhydride; 3,4-diiodophenylboronic anhydride, 3,4-dibromophenylboronic anhydride, 3,4-dichlorophenylboronic anhydride, 3,4-difluorophenylboronic anhydride, 4-iodophenylboronic anhydride, 4-bromophenylboronic anhydride, 4-chlorophenylboronic anhydride, 4-fluorophenylboronic anhydride, (m-terphenyl)boronic anhyride, 3,4,5-triiodophenylboronic anhyride, 3,4,5-tribromophenylboronic anhyride, 3,4,5-trichlorophenylboronic anhyride, 3,4,5-trifluorophenylboronic anhyride and the like. Among these acid anhydrides, in the present embodiment, acid anhydrides having a cyclic structure are preferred, and acid anhydrides having an unsaturated bond in the molecule are more preferred. From the viewpoint of ease of availability and from the viewpoint of having a cyclic structure and an unsaturated bond in the molecule, the acid anhydride is particularly preferably maleic anhydride.

[Cyclic Carbonate Having Unsaturated Bond]

There is no particular limitation on the kind of the cyclic carbonate having an unsaturated bond in the component (b2) as long as it does not impair the characteristics of the nonaqueous electrolyte solution of the present embodiment and the secondary battery using the same, and various cyclic carbonates having an unsaturated bond can be selected. The number of the unsaturated bonds is preferably 1 to 10, more preferably 1 to 5, and particularly preferably 1 to 3. Specific examples of the cyclic carbonate having an unsaturated bond include vinylene carbonate, iodovinylene carbonate, bromovinylene carbonate, chlorovinylene carbonate, fluorovinylene carbonate, 1,2-diiodovinylene carbonate, 1,2-dibromovinylene carbonate, 1,2-dichlorovinylene carbonate, 1,2-difluorovinylene carbonate, methyl vinylene carbonate, iodomethyl vinylene carbonate, bromomethyl vinylene carbonate, chloromethyl vinylene carbonate, fluoromethyl vinylene carbonate, dichloromethyl vinylene carbonate, dibromomethyl vinylene carbonate, dichloromethyl vinylene carbonate, difluoromethyl vinylene carbonate, triiodomethyl vinylene carbonate, tribromomethyl vinylene carbonate, trichloromethyl vinylene carbonate, trifluoromethyl vinylene carbonate, ethyl vinylene carbonate, propyl vinylene carbonate, butyl vinylene carbonate, dimethyl vinylene carbonate, diethyl vinylene carbonate, dipropyl vinylene carbonate, vinyl ethylene carbonate and the like. From the viewpoint of ease of availability, the cyclic carbonate having an unsaturated bond is preferably vinylene carbonate.

[Cyclic Carbonate Having Halogen Atom]

There is no particular limitation on the kind of the cyclic carbonate having a halogen atom in the component (b2) as long as it does not impair the characteristics of the nonaqueous electrolyte solution of the present embodiment and the secondary battery using the same, and various cyclic carbonates having a halogen atom can be selected. Herein, the halogen atom means a fluorine atom, a chlorine atom, a bromine atom or an iodine atom. Specific examples of the cyclic carbonate having a halogen atom include iodoethylene carbonate, bromoethylene carbonate, chloroethylene carbonate, fluoroethylene carbonate, 1,2-diiodoethylene carbonate, 1,2-dibromoethylene carbonate, 1,2-dichloroethylene carbonate, 1,2-difluoroethylene carbonate and the like. From the viewpoint of ease of availability, chloroethylene carbonate and fluoroethylene carbonate are preferred as the cyclic carbonate having an unsaturated bond.

[Cyclic Sulfonic Acid Ester]

There is no particular limitation on the kind of the cyclic sulfonic acid ester in the component (b2) as long as it does not impair the characteristics of the nonaqueous electrolyte solution of the present embodiment and the secondary battery using the same, and various cyclic sulfonic acid esters can be selected. Specific examples of the cyclic sulfonic acid ester include 1,3-propane sultone, 2,4-butane sultone, 1,4-butane sultone, ethylenesulfite and the like. From the viewpoint of ease of availability, 1,3-propane sultone and ethylenesulfite are preferred as the cyclic sulfonic acid ester

[Amines Having Acetoacetyl Group]

The amines having an acetoacetyl group in the component (b2) are specifically one represented by the following general formula (3).

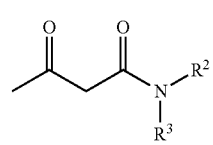

(3)

$R^2$ and $R^3$ each independently represent a hydrocarbon group having 1 to 20 carbon atoms, preferably 1 to 10 carbon atoms, and more preferably 1 to 5 carbon atoms, or a hydrocarbon group having 1 to 20 carbon atoms, preferably 1 to 10 carbon atoms, more preferably 1 to 5 carbon atoms, and having a halogen atom, a heteroatom or an unsaturated bond. Here, the halogen atom means a fluorine atom, a chlorine atom, a bromine atom or an iodine atom. The heteroatom means an oxygen atom, a nitrogen atom or a sulfur atom.

There is no particular limitation on $R^2$ and $R^3$, and examples thereof include chain alkyl groups such as a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; chain halogen-containing alkyl groups such as a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a hexafluoro-2-propyl group; cyclic halogen-containing alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and a 3-cyclohexenyl group; cyclic alkynyl groups such as a 2-propynyl group, a 1-butynyl group, a 2-butynyl group, a 3-butynyl group, a 1-pentynyl group, a 2-pentynyl group, a 3-pentynyl group and a 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; and naphthyl groups such as a 1-naphthyl group, a 2-naphthyl group and a 3-amino-2-naphthyl group.

$R^2$ and $R^3$ are independent of each other and may be the same or different. Specific examples of the group of functional groups shown above are merely exemplifications, and the present embodiment is not limited to these examples.

Specific examples of the compound represented by the chemical formula (3) include N,N-dimethylacetoacetamide, N,N-diethylacetoacetamide, N,N-dipropylacetoacetamide, N,N-dibutylacetoacetamide, N,N-ethylmethylacetoacetamide, N,N-methylpropylacetoacetamide, N,N-butylmethylacetoacetamide and the like. Specific examples of these compounds are merely exemplifications, and the functional group is not limited thereto.

[Phosphorus Compound Represented by Chemical Formula (4)]

Examples of the phosphorus compound in the component (b2) include those represented by the following chemical formula (4).

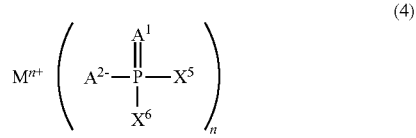

(4)

In the chemical formula (4), $M^{n+}$ is as already described and represents an alkali metal ion, an alkaline earth metal ion, an aluminum ion, a transition metal ion or an onium ion. n is a valence as in the case of the chemical formula (1). Therefore, detailed description thereof will be omitted.

$A^1$ and $A^2$ each independently represent an oxygen atom, a sulfur atom or a selenium atom.

In the chemical formula (4), $X^5$ and $X^6$ each independently represent a halogen atom, alkyl group, or an alkyl group having at least any one of a halogen atom, a heteroatom or an unsaturated bond (hereinafter referred to as "alkyl group having a halogen atom or the like"). The number of carbon atoms of alkyl group and the alkyl group having a halogen atom or the like is in a range of 1 to 20, preferably 1 to 10, and more preferably 1 to 4. The number of the unsaturated bonds is preferably in a range of 1 to 10, more preferably in a range of 1 to 5, and particularly preferably in a range of 1 to 3.

Specific examples of the alkyl group or the alkyl group having a halogen atom or the like include chain alkyl groups such as a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; chain halogen-containing alkyl groups such as a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a hexafluoro-2-propyl group; cyclic halogen-containing alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and a 3-cyclohexenyl group; cyclic alkynyl groups such as a 2-propynyl group, a 1-butynyl group, a 2-butynyl group, a 3-butynyl group, a 1-pentynyl group, a 2-pentynyl group, a 3-pentynyl group and a 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; and naphthyl groups such as a 1-naphthyl group, a 2-naphthyl group and a 3-amino-2-naphthyl group.

The halogen atom and the heteroatom are the same as those in the chemical formula (1). In the alkyl group having a halogen atom or the like, regarding the halogen atom and the heteroatom, hydrogens in the alkyl group may be partially or wholly substituted with any of the halogen atom and/or the heteroatom.

$X^5$ and $X^6$ may be those in which any of the hydrocarbon group or the hydrocarbon group having a halogen atom or the like are coupled to each other to form a cyclic structure. In this case, examples of the alkyl group or the alkyl group having a halogen atom or the like in $X^5$ and $X^6$ include linear alkylene groups such as a methylene group, an ethylene group, a propylene group, a butylene group, a pentylene group, a hexylene group, a hepthylene group, an octylene group and a nonylene group; halogen-containing linear alkylene groups such as an iodomethylene group, a diiodomethylene group, a bromomethylene group, a dibromomethylene group, a fluoromethylene group, a difluoromethylene group, a iodoethylene group, a 1,1-diiodoethylene group, a 1,2-diiodoethylene group, a triiodoethylene group, a tetraiodoethylene group, a chloroethylene group, a 1,1-dichloroethylene group, a 1,2-dichloroethylene group, a trichloroethylene group, a tetrachloroethylene group, a fluoroethylene group, a 1,1-difluoroethylene group, a 1,2-difluoroethylene group, a trifluoroethylene group and a tetrafluoroethylene group; cyclic hydrocarbon groups such as a cyclohexylene group, a phenylene group, a benzylene group, a naphthylene group, an anthracylene group, a naphthacylene group and a pentacylene group; and those which are partially or wholly substituted with a halogen atom.

$X^5$ and $X^6$ may be the same or different from each other in the group of functional groups mentioned above. The group of the functional groups mentioned above is merely an exemplification, and the functional group is not limited thereto.

Specific examples of the phosphorus compound represented by the chemical formula (4) include lithium diiodophosphate, lithium dibromophosphate, lithium dichlorophosphate, lithium difluorophosphate, sodium diiodophosphate, sodium dibromophosphate, sodium dichlorophosphate, sodium difluorophosphate, potassium diiodophosphate, potassium dibromophosphate, potassium dichlorophosphate, potassium difluorophosphate and the like.

[Phosphorus Compound Represented by Chemical Formula (5)]

A phosphorus compound represented by the following chemical formula (5) will be described below. Regarding those which are the same as those described in the phosphorus compound represented by the chemical formula (4), description will be omitted.

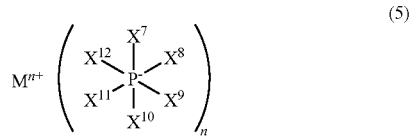

(5)

In the chemical formula (5), $M^{n+}$ and the valence n are the same as those mentioned in the chemical formula (4).

In the chemical formula (5), $X^7$ to $X^{12}$ each independently represent a halogen atom, alkyl group, an alkoxy group, an alkylthio group, or alkyl group having at least any one of a halogen atom, a heteroatom or an unsaturated bond (hereinafter referred to as "alkyl group having a halogen atom or the like"), an alkoxy group having at least any one of a halogen atom, a heteroatom or an unsaturated bond (hereinafter referred to as "an alkoxy group having a halogen atom or the like"), or an alkylthio group having at least any one of a halogen atom, a heteroatom or an unsaturated bond (hereinafter referred to as "alkylthio group having a halogen atom or the like"). The number of carbon atoms of the alkyl group, the alkoxy group, the alkylthio group, the alkyl group having a halogen atom or the like, the alkoxy group having a halogen atom or the like, and the alkylthio group having a halogen atom or the like is in a range of 1 to 20, preferably 1 to 10, and more preferably 1 to 4. The number of unsaturated bonds is preferably in a range of 1 to 10, more preferably 1 to 5, and particularly preferably 1 to 3.

The halogen atom and the heteroatom are the same as those mentioned in the chemical formula (1). In the alkyl group having a halogen atom or the like, the alkoxy group having a halogen atom or the like, and the alkylthio group having a halogen atom or the like, regarding the halogen atom and the heteroatom, hydrogens in these functional groups may be partially or wholly substituted with any one of a halogen atom and/or a heteroatom Specifically, $X^7$ to $X^{12}$ include, for example, chain alkyl groups such as a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; chain halogen-containing alkyl groups such as an iodomethyl group, a bromomethyl group, a chloromethyl group, a fluoromethyl group, a diiodomethyl group, a dibromomethyl group, a dichloromethyl group, a difluoromethyl group, a triiodomethyl group, a tribromomethyl group, a trichloromethyl group, a trifluoromethyl group, a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a 1,1,1,3,3,3-hexafluoro-2-propyl group; cyclic halogen-containing alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and a 3-cyclohexenyl group; chain alkynyl groups such as a 2-propynyl group, a 1-butynyl group, a 2-butynyl group, a 3-butynyl group, a 1-pentynyl group, a 2-pentynyl group, a 3-pentynyl group and a 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; chain alkoxy groups such as a methoxy group, an ethoxy group, a propoxy group, a butoxy group, a pentoxy group and a hexoxy group; chain alkoxy groups such as a cyclopentoxy group and a cyclohexoxy group; chain halogen-containing alkyl groups such as a 2-iodoethoxy group, a 2-bromoethoxy group, a 2-chloroethoxy group, a 2-fluoroethoxy group, a 1,2-diiodoethoxy group, a 1,2-dibromoethoxy group, a 1,2-dichloroethoxy group, a 1,2-difluoroethoxy group, a 2,2-diiodoethoxy group, a 2,2-dibromoethoxy group, a 2,2-dichloroethoxy group, a 2,2-difluoroethoxy group, a 2,2,2-tribromoethoxy group, a 2,2,2-trichloroethoxy group, a 2,2,2-trifluoroethoxy group and a 1,1,1,3,3,3-hexafluoro-2-propoxy group; cyclic halogen-containing alkyl groups such as a 2-iodocyclohexoxy group, a 2-bromocyclohexoxy group, a 2-chlorocyclohexoxy group and a 2-fluorocyclohexoxy group; chain alkenylalkoxy groups such as a 2-propenoxy group, an isopropenoxy group, a 2-butenoxy group and a 3-butenoxy group; cyclic alkenylalkoxy groups such as a 2-cyclopentenoxy group, a 2-cyclohexenoxy group and a 3-cyclohexenoxy group; chain alkynylalkoxy groups such as a 2-propynoxy group, a 1-butynoxy group, a 2-butynoxy group, a 3-butynoxy group, a 1-pentynoxy group, a 2-pentynoxy group, a 3-pentynoxy group and a 4-pentynoxy group; phenoxy groups such as a phenoxy group, a 3-methylphenoxy group, a 4-methylphenoxy group and a 3,5-dimethylphenoxy group; halogen-containing phenoxy groups such as a 2-iodophenoxy group, a 2-bromophenoxy group, a 2-chlorophenoxy group, a 2-fluorophenoxy group, a 3-iodophenoxy group, a 3-bromophenoxy group, a 3-chlorophenoxy group, a 3-fluorophenoxy group, a 4-iodophenoxy group, a 4-bromophenoxy group, a 4-chlorophenoxy group, a 4-fluorophenoxy group, a 3,5-diiodophenoxy group, a 3,5-dibromophenoxy group, a 3,5-dichlorophenoxy group and a 3,5-difluorophenoxy group; alkylthio groups such as a methylthio group, an ethylthio group, a propylthio group, a butylthio group, an isopropylthio group, a pentylthio group and a hexylthio group, and the like.

At least one combination optionally selected from $X^7$ to $X^{12}$ may form any one of cyclic structures of —OOC—Z—COO—, —OOC—Z—O— or —O—Z—O—. When $X^7$ to $X^{12}$ form two or more cyclic structures, the cyclic structures may be the same as or different from each other. Z represents a hydrocarbon group having 0 to 20 carbon atoms, or a hydrocarbon group having 0 to 20 carbon atoms and having at least one of a halogen atom, a heteroatom, an unsaturated bond or a cyclic structure. The number of unsaturated bonds is preferably in a range of 1 to 10, more preferably 1 to 5, and particularly preferably 1 to 3.

Z is not particularly limited and specifically includes, for example, linear alkylene groups such as a methylene group, an ethylene group, a propylene group, a butylene group, a pentylene group, a hexylene group, a hepthylene group, an octylene group and a nonylene group; halogen-containing linear alkylene groups such as an iodomethylene group, a diiodomethylene group, a bromomethylene group, a dibromomethylene group, a fluoromethylene group, a difluoromethylene group, a iodoethylene group, a 1,1-diiodoethylene group, a 1,2-diiodoethylene group, a triiodoethylene group, a tetraiodoethylene group, a chloroethylene group, a 1,1-dichloroethylene group, a 1,2-dichloroethylene group, a trichloroethylene group, a tetrachloroethylene group, a fluoroethylene group, a 1,1-difluoroethylene group, a 1,2-difluoroethylene group, a trifluoroethylene group and a tetrafluoroethylene group; cyclic hydrocarbon groups such as a cyclohexylene group, a phenylene group, a benzylene group, a naphthylene group, an anthracylene group, a naphthacylene group and a pentacylene group; and those which are partially or wholly substituted with halogen.

For example, when the carbon number of Z is 0, —OOC—Z—COO— is —OOC—COO— and represents an oxalate group. When Z is a 1,2-phenylene group, —O—Z—O— represents a benzene dioleate group and —O—Z—COO— represents a salicylate group.

Specific examples of the phosphorus compound represented by the chemical formula (5) include lithium difluorobisoxalate phosphate, sodium difluorobisoxalate phosphate, lithium tetrafluorooxalate phosphate, sodium tetrafluorooxalate phosphate and the like

[Phosphorus Compound Represented by Chemical Formula (6)]

A phosphorus compound represented by the following chemical formula (6) will be described below. However, description of the phosphorus compounds, which are the same as described in the phosphorus compound represented by the chemical formula (4), is omitted.

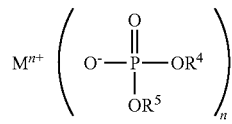

(6)

In the chemical formula (6), $M^{n+}$ and a valence n are the same as those described in the chemical formula (4).

In the chemical formula (6), $R^4$ and $R^5$ each independently represent a hydrocarbon group or a hydrocarbon having at least one of a halogen atom, a heteroatom and an unsaturated bond (hereinafter referred to as "hydrocarbon group having a halogen atom or the like"). The number of carbon atoms of the hydrocarbon group is 1 to 20, preferably 1 to 10, and more preferably 1 to 4. The number of carbon atoms of the hydrocarbon group having a halogen atom or the like is 1 to 20, preferably 1 to 10, and more preferably 1 to 4. The number of unsaturated bonds is preferably in a range of 1 to 10, more preferably 1 to 5, and particularly preferably 1 to 3.

Specifically, the hydrocarbon group or the hydrocarbon group having a halogen atom or the like include, for example, chain alkyl groups such as a methyl group, an ethyl group, a propyl group, a butyl group, an isopropyl group, a pentyl group, a hexyl group, a heptyl group and an octyl group; cyclic alkyl groups such as a cyclopentyl group and a cyclohexyl group; chain halogen-containing alkyl groups such as a 2-iodoethyl group, a 2-bromoethyl group, a 2-chloroethyl group, a 2-fluoroethyl group, a 1,2-diiodoethyl group, a 1,2-dibromoethyl group, a 1,2-dichloroethyl group, a 1,2-difluoroethyl group, a 2,2-diiodoethyl group, a 2,2-dibromoethyl group, a 2,2-dichloroethyl group, a 2,2-difluoroethyl group, a 2,2,2-tribromoethyl group, a 2,2,2-trichloroethyl group, a 2,2,2-trifluoroethyl group and a 1,1,1,3,3,3-hexafluoro-2-propyl group; cyclic halogen-containing alkyl groups such as a 2-iodocyclohexyl group, a 2-bromocyclohexyl group, a 2-chlorocyclohexyl group and a 2-fluorocyclohexyl group; chain alkenyl groups such as a 2-propenyl group, an isopropenyl group, a 2-butenyl group and a 3-butenyl group; cyclic alkenyl groups such as a 2-cyclopentenyl group, a 2-cyclohexenyl group and a 3-cyclohexenyl group; cyclic alkynyl groups such as a 2-propynyl group, a 1-butynyl group, a 2-butynyl group, a 3-butynyl group, a 1-pentynyl group, a 2-pentynyl group, a 3-pentynyl group and a 4-pentynyl group; phenyl groups such as a phenyl group, a 3-methoxyphenyl group, a 4-methoxyphenyl group, a 3,5-dimethoxyphenyl group and a 4-phenoxyphenyl group; halogen-containing phenyl groups such as a 2-iodophenyl group, a 2-bromophenyl group, a 2-chlorophenyl group, a 2-fluorophenyl group, a 3-iodophenyl group, a 3-bromophenyl group, a 3-chlorophenyl group, a 3-fluorophenyl group, a 4-iodophenyl group, a 4-bromophenyl group, a 4-chlorophenyl group, a 4-fluorophenyl group, a 3,5-diiodophenyl group, a 3,5-dibromophenyl group, a 3,5-dichlorophenyl group and a 3,5-difluorophenyl group; naphthyl groups such as a 1-naphthyl group, a 2-naphthyl group and a 3-amino-2-naphthyl group, and the like.

The halogen atom and the heteroatom are the same as those mentioned in the chemical formula (1). In the hydrocarbon group having a halogen atom or the like, regarding the halogen atom and the heteroatom, hydrogens in the hydrocarbon group may be partially or wholly substituted with any of the halogen atom and/or the heteroatom.

$R^4$ and $R^5$ may be the same or different from each other in the group of functional groups mentioned above. The group of the functional groups mentioned above is merely an exemplification, and the functional group is not limited thereto.

Furthermore, $R^4$ and $R^5$ are any of the hydrocarbon group or the hydrocarbon group having the halogen atom or the like and may be coupled to each other to form a cyclic structure. In this case, specifically, the hydrocarbon group or the hydrocarbon group having a halogen atom or the like include linear alkylene groups such as a methylene group, an ethylene group, a propylene group, a butylene group, a pentylene group, a hexylene group, a hepthylene group, an octylene group and a nonylene group; halogen-containing linear alkylene groups such as an iodomethylene group, a diiodomethylene group, a bromomethylene group, a dibromomethylene group, a fluoromethylene group, a difluoromethylene group, a iodoethylene group, a 1,1-diiodoethylene group, a 1,2-diiodoethylene group, a triiodoethylene group, a tetraiodoethylene group, a chloroethylene group, a 1,1-dichloroethylene group, a 1,2-dichloroethylene group, a trichloroethylene group, a tetrachloroethylene group, a fluoroethylene group, a 1,1-difluoroethylene group, a 1,2-difluoroethylene group, a trifluoroethylene group and a tetrafluoroethylene group; cyclic hydrocarbon groups such as a cyclohexylene group, a phenylene group, a benzylene group, a naphthylene group, a anthracylene group, a naphthacylene group and a pentacylene group; and those which are partially or wholly substituted with a halogen atom.

Specific examples of the phosphorus compound represented by the chemical formula (6) include lithium diethyl phosphate, lithium bis(2,2,2-trifluoroethyl)phosphate and the like.

An addition amount of the component (B) is preferably in a range of 0.05% by mass to 5% by mass, more preferably in a range of 0.1% by mass to 3% by mass, and particularly preferably in a range of 0.5% by mass to 2% by mass of a total mass of the nonaqueous electrolyte solution. When the addition amount is 0.05% by mass or more, this enables the effect as an additive, that is, formation of a stable coating on the surface of an electrode. On the other hand, when the addition amount is 5% by mass or less, it is possible to suppress lowering of the solubility of an electrolyte of a nonaqueous electrolyte solution in a solvent of a nonaqueous electrolyte solution.

Further, in the present embodiment, with respect to the component (B), at least one type of the component (B) has to be contained in the nonaqueous electrolyte solution; however, the number of types of the compound (B) to be contained is preferably 1 to 5, more preferably 1 to 3, and particularly preferably 1 to 2. By reducing the number of types of the component (B), it is possible to reduce the complication of a process step in producing a nonaqueous electrolyte solution. The component (B) can be produced by a conventionally known method.

<Electrolyte>

As the electrolyte, publicly known electrolytes can be employed. For example, a lithium salt is used in the case of lithium ion battery applications, and a sodium salt is used in the case of sodium ion battery applications. Therefore, a type of the electrolyte may be appropriately selected according to the type of the secondary battery.

Further, as the electrolyte, an electrolyte containing an anion containing fluorine is preferred. Specific examples of such fluorine-containing anions include $BF_4^-$, $PF_6^-$, $BF_3CF_3^-$, $BF_3C_2F_5^-$, $CF_3SO_3^-$, $C_2F_5SO_3^-$, $C_3F_7SO_3^-$, $C_4F_9SO_3^-$, $N(SO_2F)_2^-$, $N(CF_3SO_2)_2^-$, $N(C_2F_5SO_2)_2^-$, $N(CF_3SO_2)(CF_3CO)^-$, $N(CF_3SO_2)(C_2F_5SO_2)^-$, $C(CF_3SO_2)_3^-$, and the like. These fluorine-containing anions may be used alone or may be used in combination of two kinds or more thereof. Of the fluorine-containing anions, $BF_4^-$, $PF_6^-$ and $N(CF_3SO_2)_2^-$ are preferred, and $BF_4^-$ and $PF_6^-$ are particularly preferred from the viewpoint of safety/stability of a nonaqueous electrolyte solution and improvement in an electric conductivity and cycle characteristics.

The concentration of the electrolyte in the organic solvent is not particularly limited, and it is usually 0.1 to 2M, preferably 0.15 to 1.8M, more preferably 0.2 to 1.5M, and particularly preferably 0.3 to 1.2M. When the concentration is 0.1M or more, it is possible to prevent the electric conductivity of the nonaqueous electrolyte solution from becoming insufficient. On the other hand, when the concentration is 2M or less, it is possible to suppress the lowering of the electric conductivity due to an increase of viscosity of the nonaqueous electrolyte solution in order to prevent deterioration of secondary battery performance.

<Organic Solvent>

The organic solvent (nonaqueous solvent) to be used for the nonaqueous electrolyte solution are not particularly limited, and examples thereof include cyclic carbonic acid esters, chain carbonic acid esters, phosphoric acid esters, cyclic ethers, chain ethers, lactone compounds, chain esters, nitrile compounds, amide compounds, sulfone compounds and the like. Among these organic solvents, the carbonic acid ester is preferred in the viewpoint that it is commonly used as an organic solvent for a lithium secondary battery.

The cyclic carbonic acid esters are not particularly limited, and examples thereof include ethylene carbonate, propylene carbonate, butylene carbonate and the like. Among these carbonates, cyclic carbonates such as ethylene carbonate and propylene carbonate are preferred from the viewpoint of improving charge efficiency of a lithium secondary battery. The chain carbonic acid esters are not particularly limited, and examples thereof include dimethyl carbonate, ethyl methyl carbonate, diethyl carbonate and the like. Among these carbonates, dimethyl carbonate and ethyl methyl carbonate are preferred from the viewpoint of improving charge efficiency of a lithium secondary battery. The phosphoric acid esters are not particularly limited, and examples thereof include trimethyl phosphate, triethyl phosphate, ethyl dimethyl phosphate, diethyl methyl phosphate and the like. The cyclic ethers are not particularly limited, and examples thereof include tetrahydrofuran, 2-methyl tetrahydrofuran and the like. The chain ethers are not particularly limited, and examples thereof include dimethoxyethane and the like. The lactone compounds are not particularly limited, and examples thereof include γ-butyrolactone and the like. The chain esters are not particularly limited, and examples thereof include methyl propionate, methyl acetate, ethyl acetate, methyl formate and the like. The nitrile compounds are not particularly limited, and examples thereof include acetonitrile and the like. The amide compounds are not particularly limited, and examples thereof include dimethylformamide and the like. The sulfone compounds are not particularly limited, and examples thereof include sulfolane, methylsulfolane and the like. Further, organic solvents obtained by substituting, with fluorine, at least a part of hydrogens of hydrocarbon groups contained in molecules of the aforementioned organic solvents, can be suitably used. These organic solvents may be used alone or may be used as a mixture of two or more thereof.

As the organic solvent, a carbonic acid ester is preferably used from the viewpoint of ease of availability and performance.

<Production of Nonaqueous Electrolytic Solution>

The nonaqueous electrolyte solution of the present embodiment is obtained, for example, by adding a salt of the aforementioned electrolyte to the aforementioned organic solvent (nonaqueous solvent), then adding at least one type of the component (A). The component (B) may be further added. In the process of these additions, it is preferred to use the organic solvent, the salt of the electrolyte, and the components (A) and (B) which are low in impurities as far as possible by previously purifying them within a scope which does not lower production efficiency. In addition, when a plurality of types of the component (A) or (B) are used, the order of addition of them can be appropriately set as required.

<Others>

Conventionally known other additives may be added to the nonaqueous electrolyte solution of the present embodiment. In this case, the addition amount of other additives can be appropriately set as required.

(Secondary Battery)

A lithium ion secondary battery will be described below as an example of the secondary battery of the present invention. FIG. 1 is a schematic sectional view showing an outline of a lithium ion secondary battery including the nonaqueous electrolyte solution.

The lithium ion secondary battery of the present embodiment has a structure in which a laminated body formed by laminating a positive electrode 1, a separator 3, a negative electrode 2, and a spacer 7 in this order from a side of a positive electrode can 4, is housed in an internal space that the positive electrode can 4 forms with a negative electrode can 5, as shown in FIG. 1. By interposing a spring 8 between the negative electrode can 5 and the spacer 7, the positive electrode 1 and the negative electrode 2 are moderately fixed to each other by pressure. The nonaqueous electrolyte solution containing the component (A) or the group of the components (A) and (B) of the present embodiment is impregnated between the positive electrode 1 and the separator 3, and between the separator 3 and the negative electrode 2. The positive electrode can 4 and the negative electrode can 5 are supported by sandwiching a gasket 6 between the positive electrode can 4 and the negative electrode can 5 and joined to each other to hermetically seal the laminated body.

A material of a positive electrode active material layer in the positive electrode 1 is not particularly limited, and examples thereof include transition metal compounds having a structure in which lithium ions can be diffused and oxides of the transition metal compound and lithium. Examples of the specific materials to be used include oxides such as $LiCoO_2$, $LiNiO_2$, $LiMn_2O_4$, $Li_2MnO_3$+$LiMeO_2$ (Me is Mn, Co or Ni) solid solution, $LiFePO_4$, $LiCoPO_4$, $LiMnPO_4$, $Li_2FePO_4F$, $LiNi_xCo_yMn_zO_2$ (0≤x≤1, 0≤y≤1, 0≤z≤1, x+y+z=1), $LiNi_xCo_yAl_zO_2$ (0≤x≤1, 0≤y≤1, 0≤z≤1, x+y+z=1), $LiFeF_3$, $TiO_2$, $V_2O_5$ and $MoO_3$; sulfides such as $TiS_2$ and FeS; conductive polymers such as polyacetylene, polyparaphenylene, polyaniline and polypyrrole; an activated carbon; polymers generating radicals; carbon materials; and the like.

The positive electrode 1 can be obtained by molding the positive electrode active material described above by pressure molding together with a conduction aid and a binder which are publicly known, or by mixing a positive electrode active material in an organic solvent such as pyrrolidone together with a conduction aid and a binder which are publicly known to form a paste, applying the paste onto a current collector of an aluminum foil or the like, and drying the paste.

A material of a negative electrode active material layer in the negative electrode 2 is not particularly limited as long as it is a material capable of storing/releasing lithium, and examples thereof include metal composite oxides, lithium metal, lithium alloys, silicon, silicon-based alloys, tin-based alloys, metal oxides, conductive polymers such as polyacetylene, Li—Co—Ni-based materials, carbon materials and the like.

The metal composite oxides are not particularly limited, and examples thereof include $Li_xFe_2O_3$ (0≤x≤1), $Li_xWO_2$ (0≤x≤1), $Sn_xMe^1_{1-x}Me^2_yO_z$ ($Me^1$ is Mn, Fe, Pb or Ge, $Me_2$ is Al, B, P, Si, elements in Groups 1 to 3 of a periodic table or halogens, and 0<x≤1, 1≤y≤3 and 1≤z≤8).

The metal oxides are not particularly limited, and examples thereof include SnO, $SnO_2$, $SiO_x$ (0<x<2), PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$ and the like The carbon materials are not particularly limited, and examples thereof include natural graphite, artificial graphite, borated graphite, fluorinated graphite, meso-carbon microbead, graphitize pitch-based carbon fiber, carbon nanotube, hard carbon, fullerene and the like.

For the negative electrode 2, a foil-like electrode material or a powdery electrode material of the aforementioned electrode material can be used. In the case of the powdery electrode material, the negative electrode 2 can be obtained by molding the electrode material by pressure molding together with a conduction aid and a binder which are publicly known, or by mixing the electrode material in an organic solvent such as pyrrolidone together with a conduction aid and a binder which are publicly known to form a paste, applying the paste onto a current collector of a copper foil or the like, and drying the paste.

In the lithium ion secondary battery of the present embodiment, a separator 3 is interposed between the positive electrode 1 and the negative electrode 2 in order to prevent short circuit therebetween. A material or a shape of the separator 3 is not particularly limited; however, the material is preferably a material through which the aforementioned nonaqueous electrolyte solution can easily pass and which is insulating and chemically stable. Examples of such a material include microporous films or sheets made of various polymer materials. As the specific examples of the polymer material, nylon (registered trademark), nitrocellulose, polyacrylonitrile, polyvinylidene fluoride, and polyolefinic polymers, such as polyethylene and polypropylene, are used. The polyolefinic polymers are preferred from the viewpoint of electrochemical stability and chemical stability.

An optimum service voltage of the lithium ion secondary battery of the present embodiment varies among combinations of the positive electrode 1 and the negative electrode 2, and the voltage can be usually used in a range of 2.4 V to 4.6 V.

A shape of the lithium ion secondary battery of the present embodiment is not particularly limited, and examples thereof include a cylindrical shape, a prismatic shape, a laminate shape and the like in addition to a coin shape shown in FIG. 1.

According to the secondary battery of the present embodiment, it is possible to exhibit excellent cycle characteristics even in high-temperature environments, and the nonaqueous electrolyte solution of the present embodiment can be suitably used for, for example, a lithium ion secondary battery. However, the lithium ion secondary battery shown in FIG. 1 is shown as an example of an aspect of the secondary battery of the present invention, and the secondary battery of the present invention is not limited to this example.

EXAMPLES

Suitable examples of the present invention will be described in detail below by way of examples. However, materials or mixing amounts described in these examples do not purport to limit the scope of the present invention only to these unless there is a definitive description.

(Lithium Ethyl Monofluorophosphate)

<Synthesis of Diethyl Monofluorophosphate>

In a 300 mL recovery flask equipped with a stirrer, 33.7 g of potassium fluoride and 150 g of acetonitrile were added, and 50.3 g of diethyl chlorophosphate <manufactured by Tokyo Chemical Industry Co., Ltd.> was further added. Subsequently, the solution in the recovery flask was heated under reflux at 100° C. for 7 hours while stirring. The solution was allowed to cool to room temperature and then excessive potassium fluoride and the precipitated potassium chloride were removed by suction filtration. The solvent in the filtrate obtained by an evaporator was distilled off to obtain 42 g of the objective diethyl monofluorophosphate as a pale yellow transparent liquid.

<Synthesis of Lithium Ethyl Monofluorophosphate>

In a 100 mL recovery flask equipped with a stirrer, 1.1 g of lithium chloride and 20.0 g of diethyl monofluorophosphate were added. Heating under reflux was performed 120° C. for 1.5 hours under nitrogen gas flow. The reaction solution was allowed to cool to room temperature and the precipitate in the reaction solution was collected by suction filtration to obtain a white solid. Drying was performed at 130° C. under nitrogen gas flow to obtain 3.0 g of the objective lithium ethyl monofluorophosphate.

The thus obtained white solid was subjected to anion analysis by ion chromatography <model number: IC-850, manufactured by Metrohm AG> and one new peak was detected. The results revealed that a new anion was generated. Further, cation analysis was performed by ion chromatography <model number: ICS-1500, manufactured by Dionex Corporation> and a peak of lithium ion was detected. Further, when the thus obtained white solid was subjected to negative ion analysis by LC/MS (manufactured by Waters Corporation), a mass peak was observed at m/z=126.9. It approximately agreed with the molecular weight of the ethyl monofluorophosphosphoric acid anion, and it was confirmed that the thus obtained white solid is ethyl monofluorophosphate.

(Lithium Methyl Monofluorophosphate)

<Synthesis of Dimethyl Monofluorophosphate>

In a 100 mL recovery flask equipped with a stirrer, 3.9 g of potassium fluoride and 20 g of acetonitrile were added and 6.5 g of dimethyl chlorophosphate was further added. Thereafter, the solution was heated under reflux at 80° C. to 100° C. for 2 hours while stirring the solution in the recovery flask. Further, the solution was allowed to cool to room temperature and then filtered under reduced pressure to separate into the white solid and the filtrate. Thereby, an acetonitrile solution of dimethyl monofluorophosphate which is a pale yellow transparent liquid was obtained.

<Synthesis of Lithium Methyl Monofluorophosphate>

In a 50 mL recovery flask equipped with a stirrer, 1.0 g of lithium chloride, anhydrous was added and a solution of the above-mentioned dimethyl fluorophosphate in acetonitrile was added. Thereafter, the solution was heated under reflux at 110° C. to 120° C. for 4 hours while stirring the solution in the recovery flask. After the solution was allowed to cool to room temperature, the solvent in the solution was distilled off under reduced pressure at 40° C. to obtain 2.1 g of a white solid.

The thus obtained white solid was subjected to anion analysis by ion chromatography <model number: IC-850, manufactured by Metrohm AG> and one new peak was detected. The results revealed that a new anion was generated. Further, when the thus obtained white solid was subjected to negative ion analysis by LC/MS (manufactured by Waters Corporation), a mass peak was observed at m/z=112.9. It approximately agreed with the molecular weight of the methyl monofluorophosphosphoric acid anion, and it was confirmed that the thus obtained white solid is lithium methyl monofluorophosphate.

(Lithium Isopropyl Monofluorophosphate)

<Synthesis of Diisopropyl Fluorophosphate>

In a 100 mL recovery flask equipped with a stirrer, 5.2 g of potassium fluoride and 20 g of acetonitrile were added and 12.0 g of diisopropyl chlorophosphate was further added. Thereafter, the solution was heated under reflux at 80° C. to 100° C. for 2 hours under nitrogen gas flow while stirring the solution in the recovery flask. After the solution was allowed to cool to room temperature, excess potassium fluoride and the precipitated potassium chloride were removed by vacuum filtration. The solvent in the filtrate obtained by an evaporator was distilled off at 40° C. to obtain 10.0 g of the objective diisopropyl fluorophosphate as a pale yellow transparent liquid.

<Synthesis of Lithium Isopropyl Monofluorophosphate>

Into a 100 mL recovery flask equipped with a stirrer, 1.2 g of lithium bromide, anhydride and 20 g of acetonitrile were added and 5.0 g of diisopropyl fluorophosphate was added. Thereafter, the solution in the recovery flask was heated under reflux at 110° C. to 120° C. for 5 hours while stirring the solution in the flaks. After the solution was allowed to cool to room temperature, the precipitate in the solution was collected by vacuum filtration. Thereafter, the precipitate was dried at 130° C. under nitrogen gas flow to obtain 1.6 g of a white solid.

The thus obtained white solid was subjected to anion analysis by ion chromatography <model number: IC-850, manufactured by Metrohm AG>, and one new peak was detected. The results revealed that a new anion was generated. Further, when the thus obtained white solid was subjected to negative ion analysis with LC/MS (manufactured by Waters Corporation), a mass peak was observed at m/z=140.9. It approximately agreed with the molecular weight of the isopropyl anion of monofluorophosphate, and it was confirmed that the thus obtained white solid is lithium isopropyl monofluorophosphate.

(Lithium Butyl Monofluorophosphate)

<Synthesis of Dibutyl Fluorophosphate>

In a 100 mL recovery flask equipped with a stirrer, 4.4 g of potassium fluoride and 20 g of acetonitrile were added and 11.5 g of dibutyl chlorophosphate was further added. Thereafter, the solution was heated under reflux at 80° C. to 100° C. for 2 hours while stirring the solution in the recovery flask. The solution was allowed to cool to room temperature and filtered under reduced pressure to separate into the white solid and the filtrate. Subsequently, the solvent in the filtrate was distilled off under reduced pressure at 40° C. to obtain 6.8 g of dibutyl fluorophosphate as a pale yellow transparent liquid.

<Synthesis of Butyllithium Monofluorophosphate>

In a 100 mL recovery flask equipped with a stirrer, 1.0 g of lithium bromide, anhydride and 20 g of acetonitrile were added, and 5.0 g of the above-mentioned dibutyl fluorophosphate was further added. Thereafter, the solution was heated under reflux at 110° C. to 120° C. for 3 hours while stirring the solution in the recovery flask. After the solution was allowed to cool to room temperature, the precipitate in the solution was filtered off by vacuum filtration. Thereafter, the precipitate was dried at 130° C. under nitrogen gas flow to obtain 1.6 g of a white solid.

The thus obtained white solid was subjected to anion analysis by ion chromatography <model number: IC-850, manufactured by Metrohm AG> and one new peak was detected. The results revealed that a new anion is generated. Further, when the thus obtained white solid was subjected to negative ion analysis with LC/MS (manufactured by Waters Corporation), a mass peak was observed at m/z=155.0. It approximately agreed with the molecular weight of the butyl monofluorophosphosphoric acid anion, and it was confirmed that the thus obtained white solid is butyl lithium monofluorophosphate.

Lithium (2-Ethoxyethyl) Monofluorophosphate
<Synthesis of bis(2-ethoxyethyl) fluorophosphate>

In a 50 mL recovery flask equipped with a stirrer, 1.5 g of potassium fluoride and 16 g of acetonitrile were added and 4.6 g of bis (2-ethoxyethyl) chlorophosphate was further added. Thereafter, the solution in the recovery flask was heated at 50° C. to 60° C. for 2 hours while stirring. Further, silica gel was added in the solution, followed by stirring. The solvent in the solution was distilled off under reduced pressure at 40° C. to obtain a white solid mixture containing the objective product.

Subsequently, a column tube with a glass filter was packed with a small amount of silica gel and the thus obtained white solid mixture was added, followed by extraction with ethyl acetate (flash column). The solvent in the solution was distilled off under reduced pressure at 40° C. to obtain 1.5 g of bis(2-ethoxyethyl) fluorophosphate as a colorless transparent liquid.

<Synthesis of lithium (2-ethoxyethyl) monofluorophosphate>

In a 50 mL recovery flask equipped with a stirrer, 0.2 g of lithium bromide, anhydrous and 10 g of acetonitrile were added, and then 1.0 g of the above-mentioned bis(2-ethoxyethyl) fluorophosphate were added. Thereafter, the solution was heated at 50° C. to 60° C., for 4.5 hours while stirring the solution in the recovery flask. After the solution was allowed to cool to room temperature, the precipitate in the solution was filtered off by vacuum filtration. Thereafter, the precipitate was dried under nitrogen gas flow at 130° C. to obtain 0.4 g of a white solid.

The thus obtained white solid was subjected to anion analysis by ion chromatography <model number: IC-850, manufactured by Metrohm AG> and one new peak was detected. The results revealed that a new anion is generated. Further, when the thus obtained white solid was subjected to negative ion analysis with LC/MS (manufactured by Waters Corporation), a mass peak was observed at m/z=170.9. It approximately agreed with the molecular weight of the (2-ethoxyethyl) monofluorophosphosphate anion, and it was confirmed that the thus obtained white solid is lithium (2-ethoxyethyl) monofluorophosphate.

<Synthesis of Ethyl Monofluorophosphate>

In a 50 mL recovery flask equipped with a stirrer, 13.7 g of the above-mentioned lithium ethylfluorophosphate and 50 g of diethyl ether were added. Subsequently, 4.0 g of sulfuric acid was added little by little while stirring the solution in the recovery flask. Thereafter, the mixture was stirred at room temperature for 1 hour. Further, the mixture was filtered under reduced pressure to separate into the white precipitate and the filtrate. Subsequently, the solvent in the filtrate was distilled off under reduced pressure to obtain 9.6 g of ethyl monofluorophosphate as a colorless transparent liquid.

The thus obtained colorless transparent liquid was subjected to anion analysis by ion chromatography <model number: IC-850, manufactured by Metrohm AG>. As a result, one peak was detected at the detection time similar to that of lithium ethylphosphate was detected and no sulfate ion was detected. The results revealed that the obtained colorless transparent liquid is ethyl monofluorophosphate.

Example 1

<Preparation of Nonaqueous Electrolytic Solution>

A nonaqueous electrolyte solution was prepared in a dry box of an argon atmosphere having a dew point of −70° C. or lower so that a concentration of $LiPF_6$ was 1.0 mol/liter in a mixed solvent of ethylene carbonate (EC) and dimethyl carbonate (DMC) (A volume ratio between EC and DMC is 1:1, produced by KISHIDA CHEMICAL Co., Ltd., lithium battery grade).

Then, to the mixed solvent, lithium monofluorophosphate was added so as to be 0.5% by mass in concentration based on the total mass of the nonaqueous electrolyte solution. Thereby, a nonaqueous electrolyte solution according to the present example was prepared.

Example 2

In the present example, to the mixed solvent, lithium bisoxalatoborate was further added so as to be 0.5% by mass in concentration based on the total mass of the nonaqueous electrolyte solution. A nonaqueous electrolyte solution of the present example was prepared in the same manner as in Example 1 except for that.

Example 3

In the present example, vinylene carbonate was further added so as to be 0.5% by mass in concentration in place of lithium bisoxalatoborate in Example 2. A nonaqueous electrolyte solution of the present example was prepared in the same manner as in Example 2 except for that.

Example 4

In the present example, fluoroethylene carbonate was further added so as to be 0.5% by mass in concentration in place of lithium bisoxalatoborate in Example 2. A nonaqueous electrolyte solution of the present example was prepared in the same manner as in Example 2 except for that.

Example 5

In the present example, trimethyl borate was further added so as to be 0.5% by mass in concentration in place of lithium bisoxalatoborate in Example 2. A nonaqueous electrolyte solution of the present example was prepared in the same manner as in Example 2 except for that.

Example 6

In the present example, lithium bis(2,2,2-trifluoroethyl) phosphate was further added so as to be 0.5% by mass in concentration in place of lithium bisoxalatoborate in Example 2. A nonaqueous electrolyte solution of the present example was prepared in the same manner as in Example 2 except for that.

Example 7

In the present example, N,N-dimethylacetoacetamide was further added so as to be 0.5% by mass in concentration in place of lithium bisoxalatoborate in Example 2. A nonaqueous electrolyte solution of the present example was prepared in the same manner as in Example 2 except for that.

Example 8

In the present example, maleic anhyride was further added so as to be 0.5% by mass in concentration in place of lithium bisoxalatoborate in Example 2. A nonaqueous electrolyte solution of the present example was prepared in the same manner as in Example 2 except for that.

Example 9

In the present example, 1,3-propane sultone was further added so as to be 0.5% by mass in concentration in place of lithium bisoxalatoborate in Example 2. A nonaqueous electrolyte solution of the present example was prepared in the same manner as in Example 2 except for that.

Example 10

In the present example, maleic anhydride was further added as the additive so as to be 0.5% by mass in concentration based on the total mass of the nonaqueous electrolyte solution. A nonaqueous electrolyte solution of the present example was prepared in the same manner as in Example 2 except for that.

Example 11

In the present example, lithium ethyl monofluorophosphate was further added so as to be 0.5% by mass in concentration in place of lithium ethyl monofluorophosphate in Example 2. A nonaqueous electrolyte solution of the present example was prepared in the same manner as in Example 2 except for that.

Example 12

In the present example, lithium isopropyl monofluorophosphate was further added so as to be 0.5% by mass in concentration in place of lithium ethyl monofluorophosphate in Example 2. A nonaqueous electrolyte solution of the present example was prepared in the same manner as in Example 2 except for that.

Example 13

In the present example, lithium butyl monofluorophosphate was further added so as to be 0.5% by mass in concentration in place of lithium ethyl monofluorophosphate in Example 2. A nonaqueous electrolyte solution of the present example was prepared in the same manner as in Example 2 except for that.

Example 14

In the present example, lithium (2-ethoxyethyl)monofluorophosphate was further added so as to be 0.5% by mass in concentration in place of lithium ethyl monofluorophosphate in Example 2. A nonaqueous electrolyte solution of the present example was prepared in the same manner as in Example 2 except for that.

Example 15

In the present example, lithium methyl monofluorophosphate was further added so as to be 0.5% by mass in concentration in place of lithium ethyl monofluorophosphate in Example 3. A nonaqueous electrolyte solution of the present example was prepared in the same manner as in Example 3 except for that.

Example 16

In the present example, lithium isopropyl monofluorophosphate was further added so as to be 0.5% by mass in concentration in place of lithium ethyl monofluorophosphate in Example 3. A nonaqueous electrolyte solution of the present example was prepared in the same manner as in Example 3 except for that.

Example 17

In the present example, lithium butyl monofluorophosphate was further added so as to be 0.5% by mass in concentration in place of lithium ethyl monofluorophosphate in Example 3. A nonaqueous electrolyte solution of the present example was prepared in the same manner as in Example 3 except for that.

Example 18

In the present example, lithium (2-ethoxyethyl)monofluorophosphate was further added so as to be 0.5% by mass in concentration in place of lithium ethyl monofluorophosphate in Example 3. A nonaqueous electrolyte solution of the present example was prepared in the same manner as in Example 3 except for that.

Example 19

In the present example, ethyl monofluorophosphate was further added so as to be 0.5% by mass in concentration in place of lithium ethyl monofluorophosphate in Example 1. A nonaqueous electrolyte solution of the present example was prepared in the same manner as in Example 1 except for that.

Example 20

In the present example, the addition was performed such that the addition concentration of lithium ethyl monofluorophosphate of Example 1 would be 0.05% by mass in concentration. A nonaqueous electrolyte solution of the present example was prepared in the same manner as in Example 1 except for that.

Example 21

In the present example, the addition was performed such that the addition concentration of lithium ethyl monofluorophosphate of Example 1 would be 2.5% by mass in concentration. A nonaqueous electrolyte solution of the present example was prepared in the same manner as in Example 1 except for that.

Example 22

In the present example, the addition was performed such that the addition concentration of lithium bis(oxalato)borate of Example 2 would be 0.05% by mass in concentration. A nonaqueous electrolyte solution of the present example was prepared in the same manner as in Example 2 except for that.

Example 23

In the present example, the addition was performed such that the addition concentration of lithium bis(oxalato)borate of Example 2 would be 5% by mass in concentration. A nonaqueous electrolyte solution of the present example was prepared in the same manner as in Example 2 except for that.

Comparative Example 1

A nonaqueous electrolyte solution was prepared in a dry box of an argon atmosphere having a dew point of −70° C.

or lower so that a concentration of $LiPF_6$ was 1.0 mol/liter in a mixed solvent of ethylene carbonate (EC) and dimethyl carbonate (DMC) (A volume ratio between EC and DMC is 1:1, produced by KISHIDA CHEMICAL Co., Ltd., lithium battery grade). Thereby, a nonaqueous electrolyte solution according to the present example was prepared.

Comparative Example 2

In the present comparative example, a nonaqueous electrolyte solution according to the present comparative example was prepared in the same manner as in Example 2 except that lithium ethyl monofluorophosphate of Example 2 was not added.
(Evaluation of Cycle Characteristics)
<Preparation of Coin Cell>
A coin type lithium secondary battery as shown in FIG. 1 was prepared, and electrochemical characteristics of the nonaqueous electrolyte solution of Examples and Comparative Examples were evaluated.

That is, $LiNi_{1/3}Co_{1/3}Mn_{1/3}O_2$ (manufactured by Piotrek Co., Ltd.), cut out into a piece of 9 mm in diameter, was used for the positive electrode, a polyethylene separator was used for the separator, and a natural graphite sheet (produced by Piotrek Co., Ltd.), cut out into a piece of 10 mm in diameter, was used for the negative electrode. Furthermore, the positive electrode, the separator, and the negative electrode were laminated in this order to form a laminated body, and the laminated body was impregnated with the nonaqueous electrolyte solution prepared in each of Examples and Comparative Examples and hermetically sealed to prepare a coin cell of each of Examples and Comparative Examples. Assembling of the coin cells was all performed in a glove box of an argon atmosphere having a dew point of −70° C. or lower.

<Aging Charge-Discharge>
The prepared coin cell was aging-charged and discharged by 5 cycles in the conditions of end-of-charge voltage of 4.2 V and end-of-discharge voltage of 3.0 V by a constant current constant voltage method of 0.2 C (a current value at which a rated capacity is charged or discharged in 1 hour is defined as 1 C) in an isothermal bath at 25° C.
<Evaluation of High-temperature Storage Characteristics>
The coin cell which had undergone aging charge-discharge was charged and discharged by 50 cycles in the conditions of end-of-charge voltage of 4.2 V and end-of-discharge voltage of 3.0 V by a constant current constant voltage method of 0.2 C in an isothermal bath at 60° C. A discharge capacity after 50 cycles was compared and evaluated. In the following Tables 1 and 2, relative discharge capacities of Examples 1 to 23 and Comparative Example 2 at the time when assuming that a discharge capacity of Comparative Example 1 is 100, are shown.

TABLE 1

| | | Nonaqueous electrolyte solution | | Capacity ratio after 50 cycles |
|---|---|---|---|---|
| | | | Additives | at 60° C. |
| | Electrolyte | Component (A) | Component (B) | (—) |
| Example 1 | $LiPF_6$ | Lithium ethyl monofluorophosphate | — | 125 |
| Example 2 | $LiPF_6$ | Lithium ethyl monofluorophosphate | Lithium bisoxalatoborate | 135 |
| Example 3 | $LiPF_6$ | Lithium ethyl monofluorophosphate | Vinylene carbonate | 129 |
| Example 4 | $LiPF_6$ | Lithium ethyl monofluorophosphate | Fluoroethylene carbonate | 130 |
| Example 5 | $LiPF_6$ | Lithium ethyl monofluorophosphate | Trimethyl borate | 128 |
| Example 6 | $LiPF_6$ | Lithium ethyl monofluorophosphate | Lithium bis(2,2,2-trifluoroethyl)phosphate | 127 |
| Example 7 | $LiPF_6$ | Lithium ethyl monofluorophosphate | N,N-dimethylacetoacetamide | 126 |
| Example 8 | $LiPF_6$ | Lithium ethyl monofluorophosphate | Maleic anhydride | 128 |
| Example 9 | $LiPF_6$ | Lithium ethyl monofluorophosphate | 1,3-Propanesultone | 127 |
| Example 10 | $LiPF_6$ | Lithium ethyl monofluorophosphate | Lithium bisoxalatoborate, Maleic anhydride | 143 |
| Example 11 | $LiPF_6$ | Lithium methyl monofluorophosphate | Lithium bisoxalatoborate | 148 |
| Example 12 | $LiPF_6$ | Lithium isopropyl monofluorophosphate | Lithium bisoxalatoborate | 126 |
| Example 13 | $LiPF_6$ | Lithium butyl monofluorophosphate | Lithium bisoxalatoborate | 146 |

TABLE 2

| | | Nonaqueous electrolyte solution | | Capacity ratio after 50 cycles |
|---|---|---|---|---|
| | | | Additives | at 60° C. |
| | Electrolyte | Component (A) | Component (B) | (—) |
| Example 14 | $LiPF_6$ | Lithium (2-ethoxyethyl) monofluorophosphate | Lithium bisoxalatoborate | 140 |
| Example 15 | $LiPF_6$ | Lithium methyl monofluorophosphate | Vinylene carbonate | 146 |
| Example 16 | $LiPF_6$ | Lithium isopropyl monofluorophosphate | Vinylene carbonate | 126 |

TABLE 2-continued

| | Nonaqueous electrolyte solution | | Capacity ratio after 50 cycles at 60° C. (—) |
|---|---|---|---|
| | Electrolyte | Additives | |
| | | Component (A) | Component (B) | |
| Example 17 | LiPF$_6$ | Lithium butyl monofluorophosphate | Vinylene carbonate | 140 |
| Example 18 | LiPF$_6$ | Lithium (2-ethoxyethyl) monofluorophosphate | Vinylene carbonate | 146 |
| Example 19 | LiPF$_6$ | Ethyl monofluorophosphate | — | 120 |
| Example 20 | LiPF$_6$ | Lithium ethyl monofluorophosphate | — | 115 |
| Example 21 | LiPF$_6$ | Lithium ethyl monofluorophosphate | — | 126 |
| Example 22 | LiPF$_6$ | Lithium ethyl monofluorophosphate | Lithium bisoxalatoborate | 129 |
| Example 23 | LiPF$_6$ | Lithium ethyl monofluorophosphate | Lithium bisoxalatoborate | 135 |
| Comparative Example 1 | LiPF$_6$ | — | — | 100 |
| Comparative Example 2 | LiPF$_6$ | — | Lithium bisoxalatoborate | 110 |

As is apparent from Tables 1 and 2, the coin cell using each of the nonaqueous electrolyte solutions of Examples 1 to 23 has a higher capacity than the coin cell using each of the nonaqueous electrolyte solutions of Comparative Examples 1 and 2 even in high-temperature environments of 60° C., and therefore it was verified that the coin cell using each of the nonaqueous electrolyte solutions of Examples 1 to 23 has excellent cycle characteristics.

DESCRIPTION OF REFERENCE SIGNS

1: Positive electrode
2: Negative electrode
3: Separator
4: Positive electrode can
5: Negative electrode can
6: Gasket
7: Spacer

What is claimed is:

1. A nonaqueous electrolytic solution for a secondary battery which is used for a secondary battery comprising an electrolyte and a nonaqueous solvent, and comprising at least one component (A) below and comprising at least one component (B) below as additives, apart from the electrolyte and the nonaqueous solvent,
component (A): a compound represented by the following chemical formula (1):

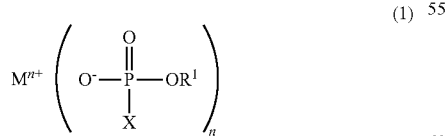

(1)

in which M$^{n+}$ represents at least one selected from the group consisting of a hydrogen ion, an alkali metal ion, an alkaline earth metal ion, an aluminum ion, a transition metal ion and an onium ion, X represents a halogen atom, R$^1$ represents a hydrocarbon group having 1 to 20 carbon atoms, or a hydrocarbon group having 1 to 20 carbon atoms and having at least any one of a halogen atom, a heteroatom or an unsaturated bond, and n represents a valence, and
component (B): N,N-dimethylacetoacetamide,

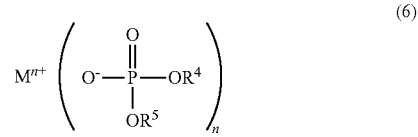

(6)

wherein an addition amount of the component (B) is 0.05% by mass to 5% by mass of a total mass of the nonaqueous electrolyte solution for a secondary battery.

2. The nonaqueous electrolyte solution for a secondary battery according to claim 1, wherein an addition amount of the component (A) is 0.05% by mass to 5% by mass of a total mass of the nonaqueous electrolyte solution for a secondary battery.

3. The nonaqueous electrolytic solution for a secondary battery according to claim 1, wherein the component (A) is lithium ethyl monofluorophosphate.

4. A secondary battery comprising the nonaqueous electrolyte solution for a secondary battery according to claim 1, comprising a positive electrode and a negative electrode.

5. The secondary battery according to claim 4, wherein an addition amount of the component (A) is 0.05% by mass to 5% by mass of a total mass of the nonaqueous electrolyte solution for the secondary battery.

6. A nonaqueous electrolytic solution for a secondary battery which is used for a secondary battery comprising an electrolyte and a nonaqueous solvent, and comprising at least one component (A) below and comprising at least one of the following component (B) below as additives, apart from the electrolyte and the nonaqueous solvent,
component (A): a compound represented by the following chemical formula (1):

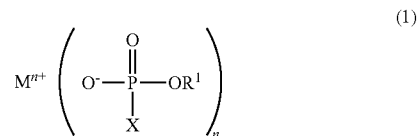

(1)

in which M$^{n+}$ represents at least one selected from the group consisting of a hydrogen ion, an alkali metal ion, an alkaline earth metal ion, an aluminum ion, a transition metal ion and an onium ion, X represents a halogen atom, R$^1$ presents a hydrocarbon group having 11 to 20 carbon atoms, or a hydrocarbon group having 11 to 20 carbon atoms and having at east any one of a halogen atom, a heteroatom or an unsaturated bond, and n represents a valence, and
component (B): a boron complex salt represented by the following chemical formula (2), or a boric acid ester, an acid anhydride, a cyclic carbonate having an unsaturated bond, a cyclic carbonate having a halogen atom, a cyclic sulfonic acid ester, amines having an acetoacetyl group represented by the following chemical formula (3), and at least one compound selected from the group consisting of phosphorus compounds represented by the following chemical formula (4) to (6):

[Chemical Formula 2]

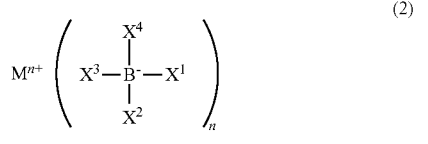

(2)

in which $M^{n+}$ represents a hydrogen ion, an alkali metal ion, an alkaline earth metal ion, an aluminum ion, a transition metal ion or an onium ion, $X^1$ to $X^4$ are independent of each other, and optionally selected one or two combinations form a cyclic structure of —OOC—Y—COO—, —O—Y—O— or —OOC—Y—O— in which Y represents a hydrocarbon group having 0 to 20 carbon atoms, or a hydrocarbon group having 0 to 20 carbon atoms and having a heteroatom, an unsaturated bond, or a cyclic structure, or $X^1$ to $X^4$ each independently represent a halogen atom, an alkyl group having 0 to 20 carbon atoms, an alkoxy group having 0 to 20 carbon atoms, an alkyl group having 0 to 20 carbon atoms and having at least any one of a halogen atom, a heteroatom or an unsaturated bond, or an alkoxy group having 0 to 20 carbon atoms and having at least any one of a halogen atom, a heteroatom or an unsaturated bond, and n represents a valence,

[Chemical Formula 3]

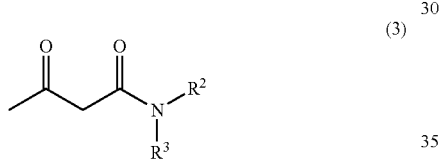

(3)

in which $R^2$ and $R^3$ each independently represent a hydrocarbon group having 1 to 20 carbon atoms, or a hydrocarbon group having 1 to 20 carbon atoms and having a halogen atom, a heteroatom or an unsaturated bond,

[Chemical Formula 4]

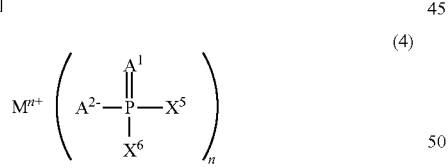

(4)

in which $M^{n+}$ represents a hydrogen ion, an alkali metal ion, an alkaline earth metal ion, an aluminum ion, a transition metal ion or an onium ion, $A^1$ and $A^2$ each independently represent an oxygen atom, a sulfur atom or a selenium atom, $X^5$ and $X^6$ each independently represent a halogen atom, an alkyl group having 1 to 20 carton atoms, or an alkyl group having 1 to 20 carbon atoms and having at least any one of a halogen atom, a heteroatom or an unsaturated bond, or $X^5$ and $X^6$ represent any one of an alkyl group having 1 to 20 carbon atoms, or an alkyl group having 1 to 20 carbon atoms and having at least any one of a halogen atom, a heteroatom or an unsaturated bond, and are coupled to each other to form a cyclic structure, and n represents a valence,

[Chemical Formula 5]

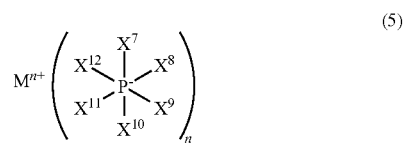

(5)

in which $M^{n+}$ represents a hydrogen ion, an alkali metal ion, an alkaline earth metal ion, an aluminum ion, a transition metal ion or an onium ion, $X^7$ to $X^{12}$ each independently represent a halogen atom, an alkyl group having 1 to 20 carbon atoms, an alkoxy group having 1 to 20 carbon atoms, an alkylthio group having 1 to 20 carbon atoms, an alkyl group having 1 to 20 carbon atoms and having at least any one of a halogen atom, a heteroatom or an unsaturated bond, an alkylthio group having 1 to 20 carbon atoms, an alkoxy group having 1 to 20 carbon atoms and having at least any one of a halogen atom, a heteroatom or an unsaturated bond, an alkylthio group having 1 to 20 carbon atoms, or an alkylthio group having 1 to 20 carbon atoms and having at least any one of a halogen atom, a heteroatom or an unsaturated bond, or at least one of combinations optionally selected from $X^7$ to $X^{12}$ forms a cyclic structure of —OOC—Z—COO—, —OOC—Z—O— or —O—Z—O— in which Z represents a hydrocarbon group having 0 to 20 carbon atoms, or a hydrocarbon group having 0 to 20 carbon atoms and having at least any one of a halogen atom, a heteroatom, an unsaturated bond or a cyclic structure, and n represents a valence,

[Chemical Formula 6]

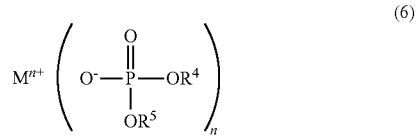

(6)

in which $M^{n+}$ represents a hydrogen ion, an alkali metal ion, an alkaline earth metal ion, an aluminum ion, a transition metal ion or an onium ion, $R^4$ and $R^5$ each independently represent a hydrocarbon group having 1 to 20 carbon atoms, or a hydrocarbon group having 1 to 20 carbon atoms and having at least any one of a halogen atom, a heteroatom or an unsaturated bond, or $R^4$ and $R^5$ represent any one of a hydrocarbon group having 1 to 20 carbon atoms, or a hydrocarbon group having 1 to 20 carbon atoms and having at least any one of a halogen atom, a heteroatom or an unsaturated bond, and are coupled to each other to form a cyclic structure, and n represents a valence.

7. The nonaqueous electrolytic solution for a secondary battery according to claim 6, wherein the component (B) is lithium difluorooxalatoborate, or at least one compound selected from the group consisting of N,N-dimethylacetoacetamide, lithium difluorophosphate, and phosphorus compound represented by the following chemical formula (6):

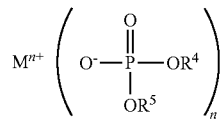
(6)

in which $M^{n+}$ represents a hydrogen ion, an alkali metal ion, an alkaline earth metal ion, an aluminum ion, a transition metal ion or an onium ion, $R^4$ and $R^5$ each independently is an ethyl group or a phenyl group, and n represents a valence.

8. The nonaqueous electrolyte solution for a secondary battery according to claim 6, wherein
   an addition amount of the component (B) is 0.05% by mass to 5% by mass of a total mass of the nonaqueous electrolyte solution for a secondary battery.

9. A secondary battery comprising the nonaqueous electrolyte solution for a secondary battery according to claim 6, comprising a positive electrode and a negative electrode.

10. The secondary battery according to claim 9, wherein an addition amount of the component (B) is 0.05% by mass to 5% by mass of a total mass of the nonaqueous electrolyte solution for the secondary battery.

11. The secondary battery according to claim 9, wherein an addition amount of the component (A) is 0.05% by mass to 5% by mass of a total mass of the nonaqueous electrolyte solution for the secondary battery.

12. The nonaqueous electrolyte solution for a secondary battery according to claim 6, wherein an addition amount of the component (A) is 0.05% by mass to 5% by mass of a total mass of the nonaqueous electrolyte solution for a secondary battery.

13. A nonaqueous electrolytic solution for a secondary battery which is used for a secondary battery comprising an electrolyte and a nonaqueous solvent, and comprising at least one component (A) below and comprising at least one component (B) below as additives, apart from the electrolyte and the nonaqueous solvent,
   component (A): a compound represented by the following chemical formula (1):

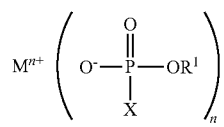
(1)

in which $M^{n+}$ represents at least one selected from the group consisting of a hydrogen ion, a sodium ion, a potassium ion, a rubidium ion, a cesium ion, an alkaline earth metal ion, an aluminum ion, a transition metal ion and an onium ion, X represents a halogen atom, $R^1$ represents a hydrocarbon group having 1 to 20 carbon atoms, or a hydrocarbon group having 1 to 20 carbon atoms and having at least any one of a halogen atom, a heteroatom or an unsaturated bond, and n represents a valence, and
   component (B): N,N-dimethylacetoacetamide,

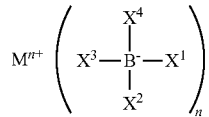
(2)

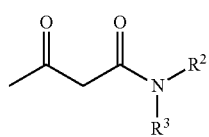
(3)

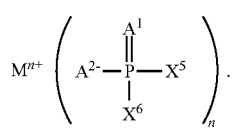
(4)

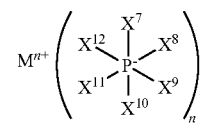
(5)

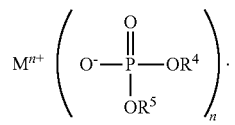
(6)

wherein an addition amount of the component (B) is 0.05% by mass to 5% by mass of a total mass of the nonaqueous electrolyte solution for a secondary battery.

14. The nonaqueous electrolyte solution for a secondary battery according to claim 13, wherein an addition amount of the component (A) is 0.05% by mass to 5% by mass of a total mass of the nonaqueous electrolyte solution for a secondary battery.

15. A secondary battery comprising the nonaqueous electrolyte solution for a secondary battery according to claim 13, comprising a positive electrode and a negative electrode.

* * * * *